US010033577B2

(12) United States Patent
Soriaga et al.

(10) Patent No.: US 10,033,577 B2
(45) Date of Patent: *Jul. 24, 2018

(54) DYNAMICALLY RECONFIGURABLE RADIO AIR INTERFACE FOR COMMUNICATING OVER A MESH NETWORK AND A WIDE AREA NETWORK

(71) Applicant: QUALCOMM Incorporated, San Diego, CA (US)

(72) Inventors: Joseph Binamira Soriaga, San Diego, CA (US); Tingfang Ji, San Diego, CA (US); Naga Bhushan, San Diego, CA (US); Krishna Kiran Mukkavilli, San Diego, CA (US); John Edward Smee, San Diego, CA (US); Jing Jiang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 154 days.

This patent is subject to a terminal disclaimer.

(21) Appl. No.: 14/863,408

(22) Filed: Sep. 23, 2015

(65) Prior Publication Data

US 2016/0119184 A1 Apr. 28, 2016

Related U.S. Application Data

(60) Provisional application No. 62/069,228, filed on Oct. 27, 2014.

(51) Int. Cl.
*H04L 12/24* (2006.01)
*H04L 27/26* (2006.01)
(Continued)

(52) U.S. Cl.
CPC ...... *H04L 41/0803* (2013.01); *H04L 27/2601* (2013.01); *H04W 8/005* (2013.01);
(Continued)

(58) Field of Classification Search
CPC .......... H04L 41/0803; H04L 27/2601; H04W 8/005; H04W 52/0219; H04W 52/028;
(Continued)

(56) References Cited

U.S. PATENT DOCUMENTS 7,983,702 B2   7/2011  Li et al.
RE43,670 E  *  9/2012  Webster .............. H04L 25/0226
                                                         375/260
(Continued)

FOREIGN PATENT DOCUMENTS

EP       1763156 A2      3/2007
WO    WO-06038085        4/2006
(Continued)

OTHER PUBLICATIONS

International Search Report and Written Opinion—PCT/US2015/052019—ISA/EPO—Dec. 10, 2015.
(Continued)

*Primary Examiner* — Habte Mered
(74) *Attorney, Agent, or Firm* — Loza & Loza LLP

(57) ABSTRACT

Methods, apparatus, and systems for wireless communication are provided. A method for wireless communication using a single radio air interface includes configuring a radio air interface of a first device to operate in accordance with a first variant of resource-spread multiple access technology, communicating wirelessly from a first device to a base station of a wide area network using the first variant of resource-spread multiple access technology, reconfiguring the radio air interface to operate in accordance with a second variant of resource-spread code division multiple access technology, and communicating wirelessly with a second device in a mesh network subsequent to reconfiguring the radio. The first device and the second device communicate wirelessly at power levels below a power level threshold
(Continued)

selected to cause the base station to ignore transmissions between the first device and the second device.

32 Claims, 23 Drawing Sheets

(51) Int. Cl.
*H04W 72/04* (2009.01)
*H04W 88/06* (2009.01)
*H04W 8/00* (2009.01)
*H04W 52/02* (2009.01)
*H04W 72/12* (2009.01)
*H04W 84/18* (2009.01)

(52) U.S. Cl.
CPC ..... *H04W 52/028* (2013.01); *H04W 52/0219* (2013.01); *H04W 72/0406* (2013.01); *H04W 72/0446* (2013.01); *H04W 72/0473* (2013.01); *H04W 72/1215* (2013.01); *H04W 72/1263* (2013.01); *H04W 88/06* (2013.01); *H04W 52/0209* (2013.01); *H04W 84/18* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/21* (2018.01); *Y02D 70/22* (2018.01)

(58) Field of Classification Search
CPC ......... H04W 72/0406; H04W 72/0446; H04W 72/0473; H04W 72/1215; H04W 72/1263; H04W 88/06; H04W 84/18; Y02B 60/50
See application file for complete search history.

(56) References Cited

U.S. PATENT DOCUMENTS

| | | | |
|---|---|---|---|
| 8,346,238 B2 | 1/2013 | Shaffer et al. | |
| 8,369,800 B2* | 2/2013 | Li | H04W 52/265 370/338 |
| 8,457,674 B2 | 6/2013 | Sandhu et al. | |
| 8,526,410 B2 | 9/2013 | Li et al. | |
| 8,553,644 B2 | 10/2013 | Laroia et al. | |
| 8,923,267 B2 | 12/2014 | Soliman | |
| 9,008,649 B2 | 4/2015 | Hidaka | |
| 2004/0110508 A1 | 6/2004 | Haartsen | |
| 2008/0107075 A1 | 5/2008 | Ramachandran et al. | |
| 2009/0213760 A1 | 8/2009 | Shin et al. | |
| 2010/0008436 A1* | 1/2010 | Zhang | H04L 1/0079 375/260 |
| 2010/0031107 A1* | 2/2010 | Bu | H04L 1/0071 714/748 |
| 2010/0081381 A1 | 4/2010 | Rofougaran | |
| 2012/0093098 A1 | 4/2012 | Charbit et al. | |
| 2012/0207100 A1* | 8/2012 | Hakola | H04W 76/023 370/329 |
| 2013/0012221 A1* | 1/2013 | Zou | H04W 72/10 455/452.1 |
| 2013/0083722 A1 | 4/2013 | Bhargava et al. | |
| 2013/0121296 A1 | 5/2013 | Jung et al. | |
| 2013/0128858 A1 | 5/2013 | Zou et al. | |
| 2013/0195026 A1 | 8/2013 | Johnsson et al. | |
| 2013/0230032 A1 | 9/2013 | Lu et al. | |
| 2013/0272262 A1* | 10/2013 | Li | H04W 28/02 370/330 |
| 2013/0343480 A1 | 12/2013 | Eliaz et al. | |
| 2014/0226504 A1 | 8/2014 | Tavildar et al. | |
| 2014/0241265 A1* | 8/2014 | Pragada | H04W 72/04 370/329 |
| 2015/0003309 A1 | 1/2015 | Mukherjee | |
| 2015/0009910 A1 | 1/2015 | Ryu et al. | |
| 2015/0109932 A1 | 4/2015 | Goldhamer | |
| 2015/0236947 A1 | 8/2015 | Kobayashi et al. | |
| 2016/0007336 A1* | 1/2016 | Fukuta | H04W 52/383 455/426.1 |
| 2016/0119931 A1 | 4/2016 | Soriaga | |
| 2016/0194986 A1* | 7/2016 | Yamazaki | H04W 72/04 184/6.4 |
| 2017/0099689 A1* | 4/2017 | Kalhan | H04W 76/023 |

FOREIGN PATENT DOCUMENTS

| | | |
|---|---|---|
| WO | WO-2008066929 A2 | 6/2008 |
| WO | WO-2012016378 A1 | 2/2012 |

OTHER PUBLICATIONS

Jeffrey A.G., et al., "What Will 5G Be?," IEEE Journal on Selected Areas in Communications, IEEE Service Center, Piscataway, US, vol. 32, No. 6, Jun. 1, 2014 (Jun. 1, 2014), pp. 1065-1082, XP011554180, ISSN: 0733-8716, DOI: 10.1109/JSAC.2014. 2328098.

Peng T., et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009 (Sep. 13, 2009), pp. 617-621, XP031659660, ISBN: 978-1-4244-5122-7, p. 617-p. 619.

Eyers T., et al., "Submission to the Inquiry into Broadband Wireless Technologies," Telecommunications and Information Technology Research Institute (TITR), Jul. 2002, pp. 1-7.

\* cited by examiner

| FDD Band | UL | DL |
|---|---|---|
| Macro Cells | Rx Only | Tx and Rx |
| Small Cells | Tx and Rx$^1$ | Tx and Rx |
| IOE Device | Tx and Rx | Tx$^2$ and Rx |

FIG. 17

Notes:
1. Allow if small cells have 23dBm max transmit power (e.g., same as mobile device class)
2. Allow for stationary sensors i.e., by taking on aggregator / small cell personality

1700

DYNAMICALLY RECONFIGURABLE RADIO AIR INTERFACE FOR COMMUNICATING OVER A MESH NETWORK AND A WIDE AREA NETWORK

CROSS-REFERENCE TO RELATED APPLICATIONS

This application claims priority to and the benefit of U.S. provisional patent application No. 62/069,228 filed Oct. 27, 2014, the entire content of which being incorporated herein by reference and for all applicable purposes.

TECHNICAL FIELD

The present disclosure relates generally to communication systems, and more particularly, to dynamically reconfigurable radio air interfaces in low-power devices that communicate over a mesh network and a wide area network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Emerging telecommunication standards include fourth generation (4G) technologies such as Long Term Evolution (LTE), and fifth generation (5G) technologies. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in wireless communications technologies. Preferably, improvements should be applicable to other multi-access technologies and the telecommunication standards that employ these technologies.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method, a computer program product, and an apparatus are provided that improve functionality and operational efficiency of devices that can communicate over a licensed wireless access network and over a mesh network of low-power devices.

According to certain aspects, a method for wireless communication includes configuring a radio of a first device to operate in accordance with a resource-spread multiple access (RSMA) technology, and operating the radio in accordance with one of a plurality of modes of operation. The first device may transmit wirelessly at a first power level to an entity in a wide area network in a first mode of operation. The radio may be configured to spread data over time-domain resources in the first mode of operation. The first device may transmit wirelessly at a second power level from the first device to a second device in a mesh network in a second mode of operation. The radio may be configured to spread data over frequency-domain resources in the second mode of operation. The second power level may be selected to be less than a power level calculated to cause the entity in the wide area network to ignore data transmissions by the first device in the second mode of operation if received by the entity in the wide area network.

According to certain aspects, a radio air interface of an apparatus configured for wireless communication includes a radio frequency transmitter, a first circuit configured to encode data in an encoded data stream in accordance with a single-carrier multiple access technology, a second circuit configured to modulate the encoded data stream over frequency-domain resources using orthogonal frequency division multiplex (OFDM) modulation to obtain an OFDM modulated data stream, and a third circuit configured to select between the encoded data stream and the OFDM modulated data stream to provide an input to the radio frequency transmitter. The encoded data stream may be selected when the apparatus is communicating with a remote network entity. The encoded data stream may be spread over time-domain resources. The OFDM modulated data stream may be selected when the apparatus is transmitting to a device coupled to a mesh network.

According to certain aspects, an apparatus configured for wireless communication includes a radio air interface, means for communicating wirelessly on one or more radio frequency carriers, the means for communicating wirelessly including a radio air interface, means for configuring the radio air interface, including a logic circuit configured to select an output of the radio air interface from a plurality of signals including an encoded data stream and an OFDM modulated data stream, means for encoding data in accordance with a RSMA coding scheme, where the means for encoding data provides the encoded data stream, and means for modulating the encoded data stream to obtain the OFDM modulated data stream. In a first mode of operation, the means for configuring the radio air interface may select the encoded data stream as the output of the radio air interface and data is spread data over time-domain resources. In a second mode of operation, the means for configuring the radio air interface may select the OFDM modulated data stream as the output of the radio air interface and data is spread data over frequency-domain resources. The apparatus may transmit to a base station of a wide area network in the first mode of operation, and the apparatus may transmit to a first device in a mesh network in the second mode of operation.

According to certain aspects, a computer readable medium stores computer executable code. The code may be executed by one or more processors on a processing circuit. The code may include instructions that cause the processing circuit to configure a radio of a first device to operate in accordance with a RSMA technology, and operate the radio in accordance with one of a plurality of modes of operation. The first device may transmit wirelessly at a first power level to an entity in a wide area network in a first mode of operation, where the radio is configured to spread data over time-domain resources in the first mode of operation. The first device may transmit wirelessly at a second power level from the first device to a second device in a mesh network in a second mode of operation, where the radio is configured to spread data over frequency-domain resources in the second mode of operation. The second power level may be lower than the first power level and may be less than a power level calculated to cause the entity in the wide area network to ignore data transmissions by the first device in the second mode of operation if received by the entity in the wide area network.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 17 illustrates physical layer or media access layer adaptation in a 5G network according to certain aspects disclosed herein.

DETAILED DESCRIPTION

Figure 1:
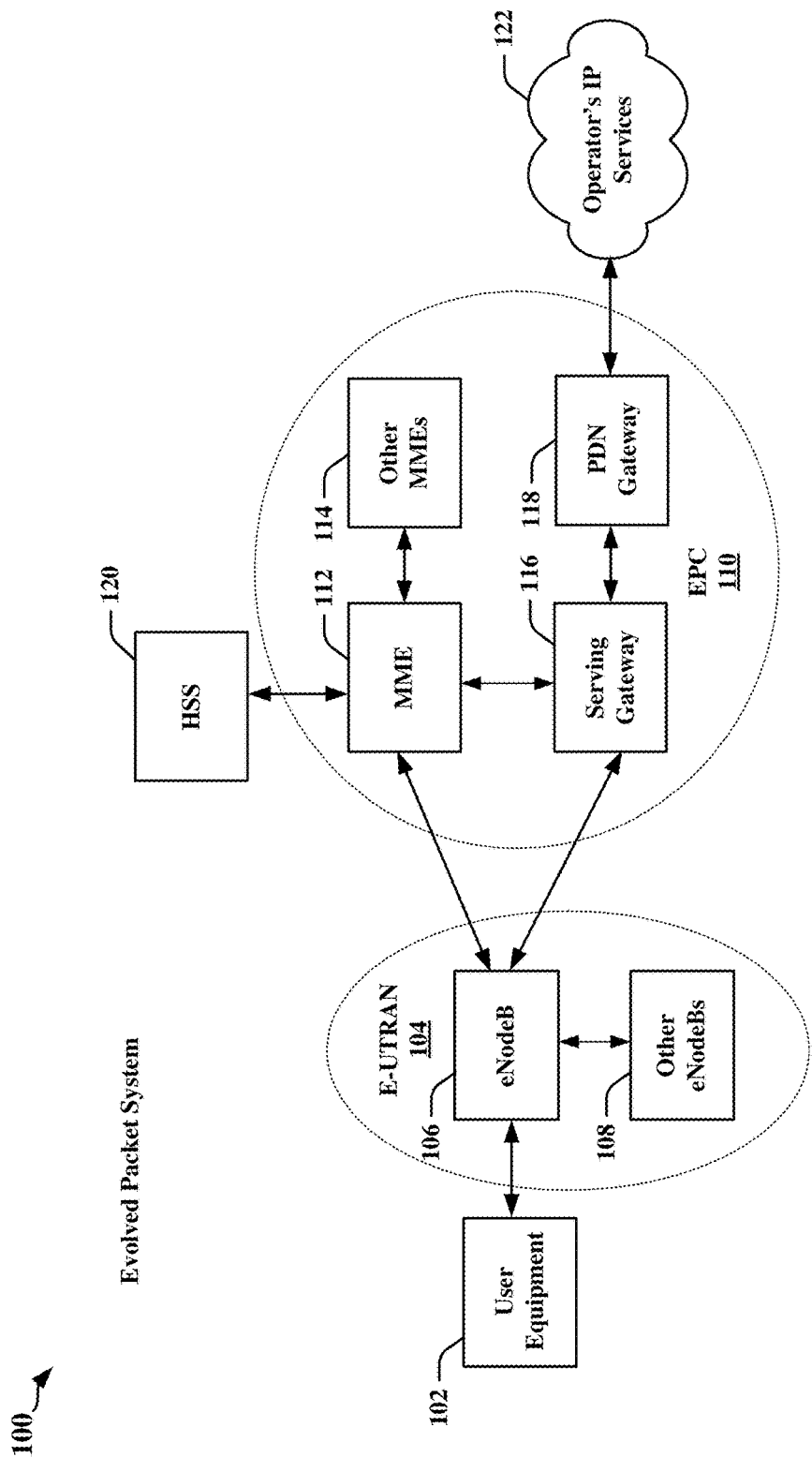
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Overview

Certain aspects of the disclosure relate to a wireless device that includes a single radio air interface that can be dynamically reconfigured to support a mode of operation that provides for long-range communications with a scheduling entity of a wireless access network and another mode of operation that provides for short-range communications with one or more devices in a mesh network. The radio air interface may be adapted according to certain aspects disclosed herein, such that it encodes data using a resource spreading scheme, and selects a type of resource over which data is to be spread based on the mode of communication.

The wireless device may employ the radio air interface may for communications over a licensed wide area network (WAN) in order to subscribe to services provided by a network operator, and to communicate with a mesh network of nearby low-power devices. The low-power devices may include devices that are transmitting with insufficient power to close a connection with a scheduling entity of a WAN. The use of a single radio air interface for low-power mesh and higher-power WAN communications can provide reductions in device power budget and design complexity.

In one example, a first device may be in range of a base station or other scheduling entity in a licensed wireless access network, and may also be within range of one or more devices capable of communicating in an unlicensed mesh network. The first device may configure its radio air interface to spread data over time-domain resources while wirelessly communicating from the first device to the base station of the licensed wireless access network. The first device may configure its radio air interface to spread data over frequency-domain resources while wirelessly communicating from the first device to other devices on the unlicensed mesh network.

More power may be consumed by the radio air interface when the first device is communicating over the licensed wireless access network than when the first device is communicating over the unlicensed mesh network. The first device may control the radio air interface such that the power levels of transmissions over the unlicensed mesh network are below levels that are detected or acknowledged by the base station in the licensed wireless access network. In some instances, the first device may configure its radio air interface to use downlink and/or uplink frequencies of the licensed wireless access network for communicating with devices on the mesh network, when the power levels of transmissions over the unlicensed mesh network are below levels that are detected or acknowledged by the base station in the licensed wireless access network.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may include any combination of available media that can be accessed by a computer.

Certain aspects of the disclosure address networks of low-power devices used in communication systems. In some scenarios, these devices can be used in newer generations of radio access technologies (RATs), including in fifth generation (5G) and later networks, as well as in fourth generation (4G) and earlier networks. The configuration and operation of a 4G LTE network architecture is described herein by way example, and for the purpose of simplifying descriptions of certain aspects that may apply to multiple RATs. That is, scenarios of LTE networks, for example, are discussed yet aspects of this disclosure are not limited. Rather this is done to help the reader understand certain implementations and embodiments.

Now turning to the figures, FIG. 1 is a diagram illustrating an LTE network architecture 100. The LTE network architecture 100 may be referred to as an Evolved Packet System (EPS). The EPS may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an Si interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
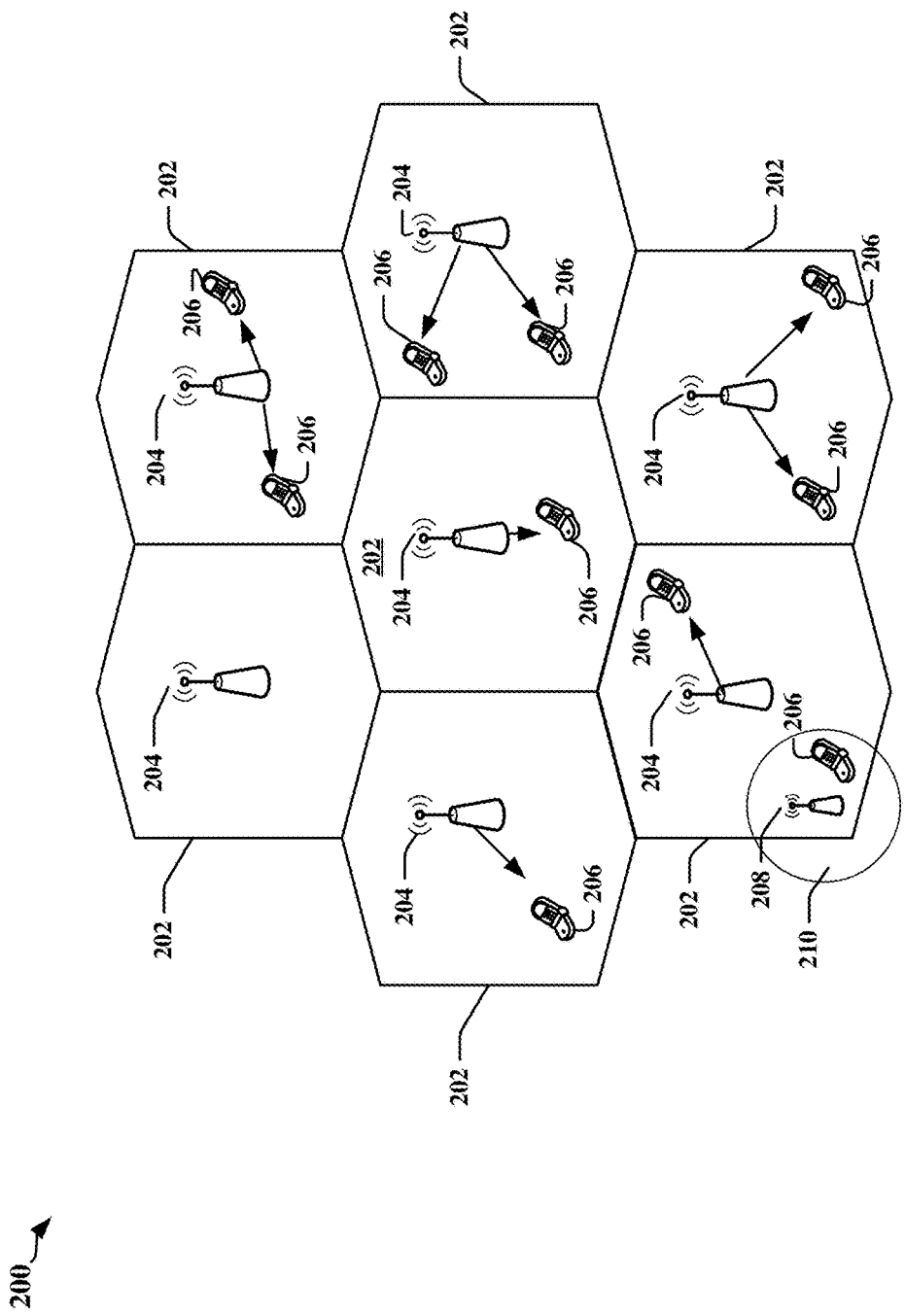
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
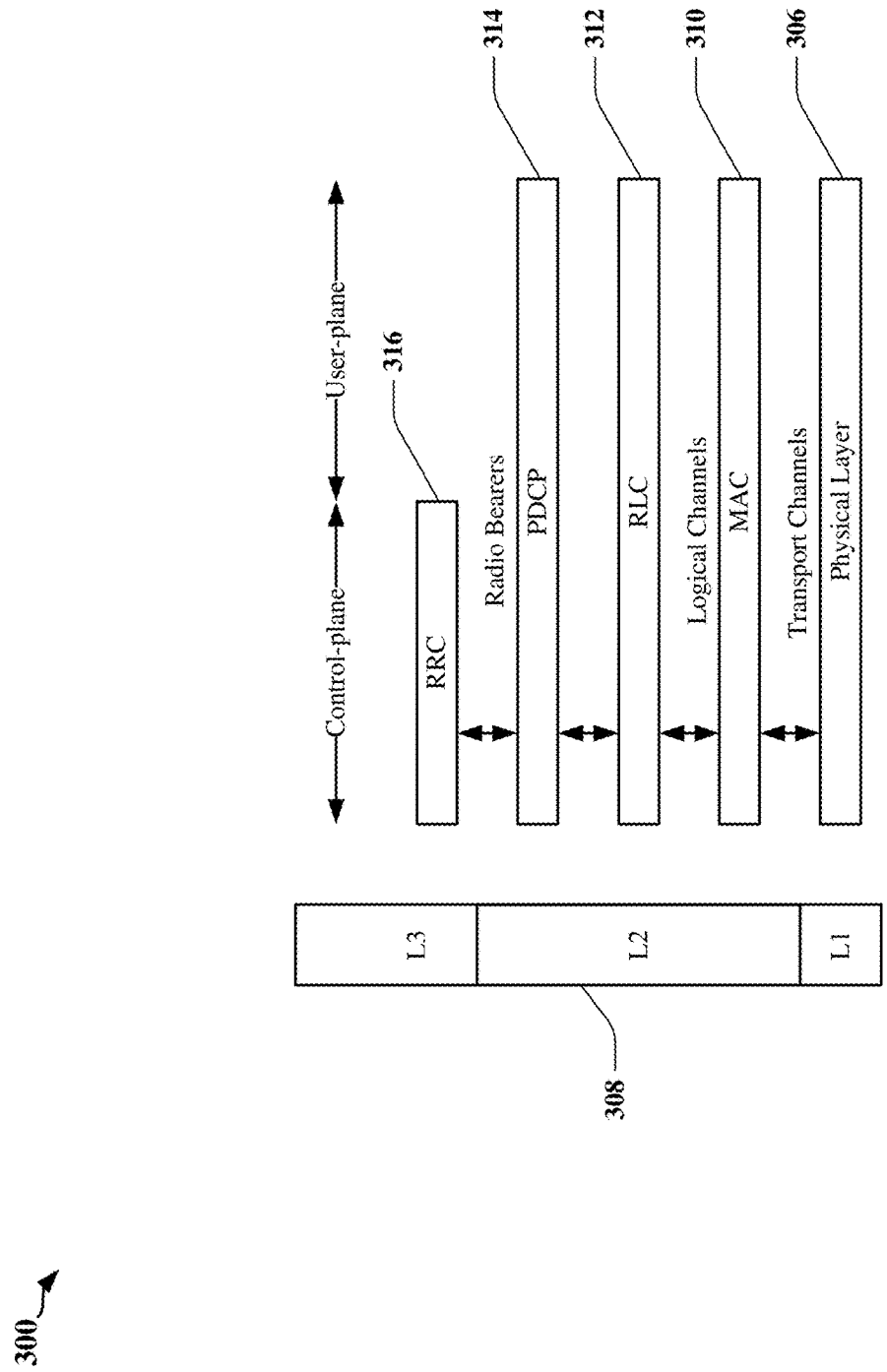
FIG. 3 is a diagram illustrating an example of a radio protocol architecture for the user and control planes.

Networks, including packet-switched networks may be structured in multiple hierarchical protocol layers, where the lower protocol layers provide services to the upper layers and each layer is responsible for different tasks. FIG. 3 is a diagram 300 illustrating an example of a radio protocol architecture for the user and control planes in an LTE implementation. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the UE may have several upper layers above the L2 layer 308 including a network layer (e.g., IP layer) that is terminated at the PDN gateway 118 on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and eNB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (i.e., radio bearers) and for configuring the lower layers using RRC signaling between the eNB and the UE.

Radio Link Setup in Wide Area Networks

A communication device, such as an access terminal, UE, mobile device, or the like, may establish a connection with a subscription network through a WAN using one or more registration, attachment, provisioning and/or other procedures. For example, radio link setup in an LTE network may involve establishment of one or more radio bearers between an access node that provides access to a network and a communication device. Radio link setup typically includes a security activation exchange. A session bearer, which may be a logical bearer or logical channel, may then be established over the radio link and one or more services and/or communications may be established over the session bearer. The session bearer, services and/or communications may be secured by one or more security keys. As part of the session bearer setup, an authentication request, and/or one or more key exchanges may take place. In networks operating according to an LTE-compatible protocol, keys may be derived by the communication device based on algorithms provided by one or more network entities.

Figure 4:
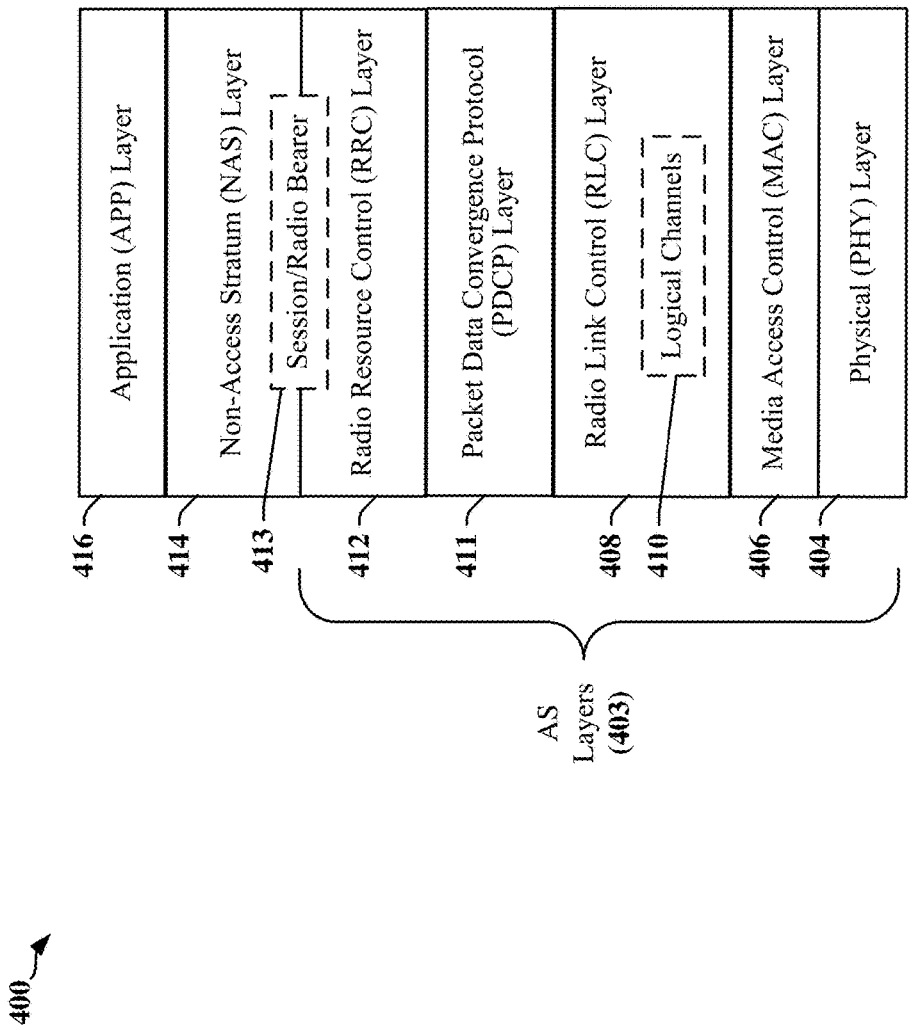
FIG. 4 illustrates an example of a protocol stack that may be implemented in a communication device operating in the example of LTE packet-switched networks.

FIG. 4 illustrates an example of a protocol stack that may be implemented in a communication device operating in a LTE packet-switched network. In this example, the LTE protocol stack 402 includes a Physical (PHY) Layer 404, a Media Access Control (MAC) Layer 406, a Radio Link Control (RLC) Layer 408, a Packet Data Convergence Protocol (PDCP) Layer 411, a RRC Layer 412, a Non-Access Access (NAS) Layer 414, and an Application (APP) Layer 416. The layers below the NAS Layer 414 are often referred to as the Access Stratum (AS) Layer 403.

The RLC Layer 408 may include one or more channels 410. The RRC Layer 412 may implement various monitoring modes for the user equipment, including connected state and idle state. The NAS Layer 414 may maintain the communication device's mobility management context, packet data context and/or its IP addresses. Note that other layers may be present in the protocol stack 402 (e.g., above, below, and/or in between the illustrated layers), but have been omitted for the purpose of illustration. Radio/session bearers 413 may be established, for example at the RRC Layer 412 and/or NAS Layer 414. Initially, communications to and/or from a communication device may be transmitted (unprotected or unencrypted) over an unsecured common control channel (CCCH). The NAS Layer 414 may be used by the communication device and an MME to generate security keys. After these security keys are established, communications including signaling, control messages, and/or user data may be transmitted over a Dedicated Control Channel (DCCH). NAS context may be reused at the time of Service Request, Attach Request and Tracking Area Update (TAU) Request.

Figure 5:
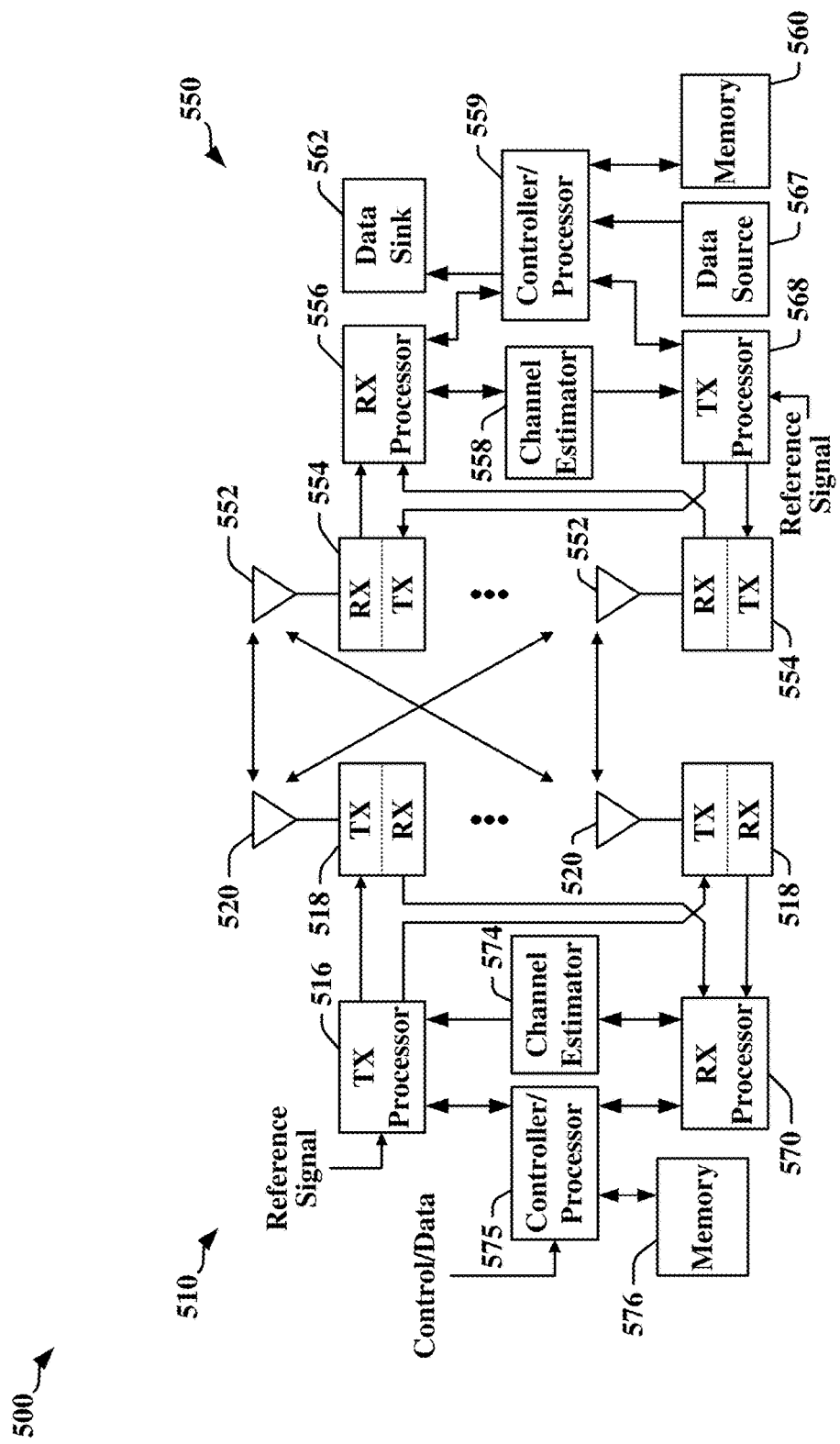
FIG. 5 is a diagram illustrating an example of an evolved Node B and user equipment deployed in an access network.

FIG. 5 is a block diagram 500 of an eNB 510 in communication with a UE 550 in an access network. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions include coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates a radio frequency (RF) carrier with a respective spatial stream for transmission.

At the UE 550, each receiver 554RX receives a signal through its respective antenna 552. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the control/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

As mentioned above, Applicant has discussed exemplary LTE-type networks to provide a foundation for the reader for certain implementations. Below, Applicant discusses additional concepts, implementation, and embodiments enabling and providing additional communication network devices, methods, and systems incorporating one on or more features for dynamically reconfigurable radio air interfaces in low-power devices that communicate over a mesh network and a wide area network.

Wide Area Networks of Low Power Devices

With the advent of ubiquitous network access and the provision of wireless communications capabilities in ever-increasing numbers of appliances and sensors, there is continuous demand for improved access to such wireless-capable appliances and sensors. Appliances and sensors are typically equipped with low-power wireless transmitters and are conventionally configured to be connected to local area networks that have limited physical range, which may be less than a few hundred meters. A large percentage of wireless-capable appliances and sensors have insufficient power to directly access in a WAN that may be operated, for example, by a telecommunications carrier using a licensed RF spectrum.

Figure 6:
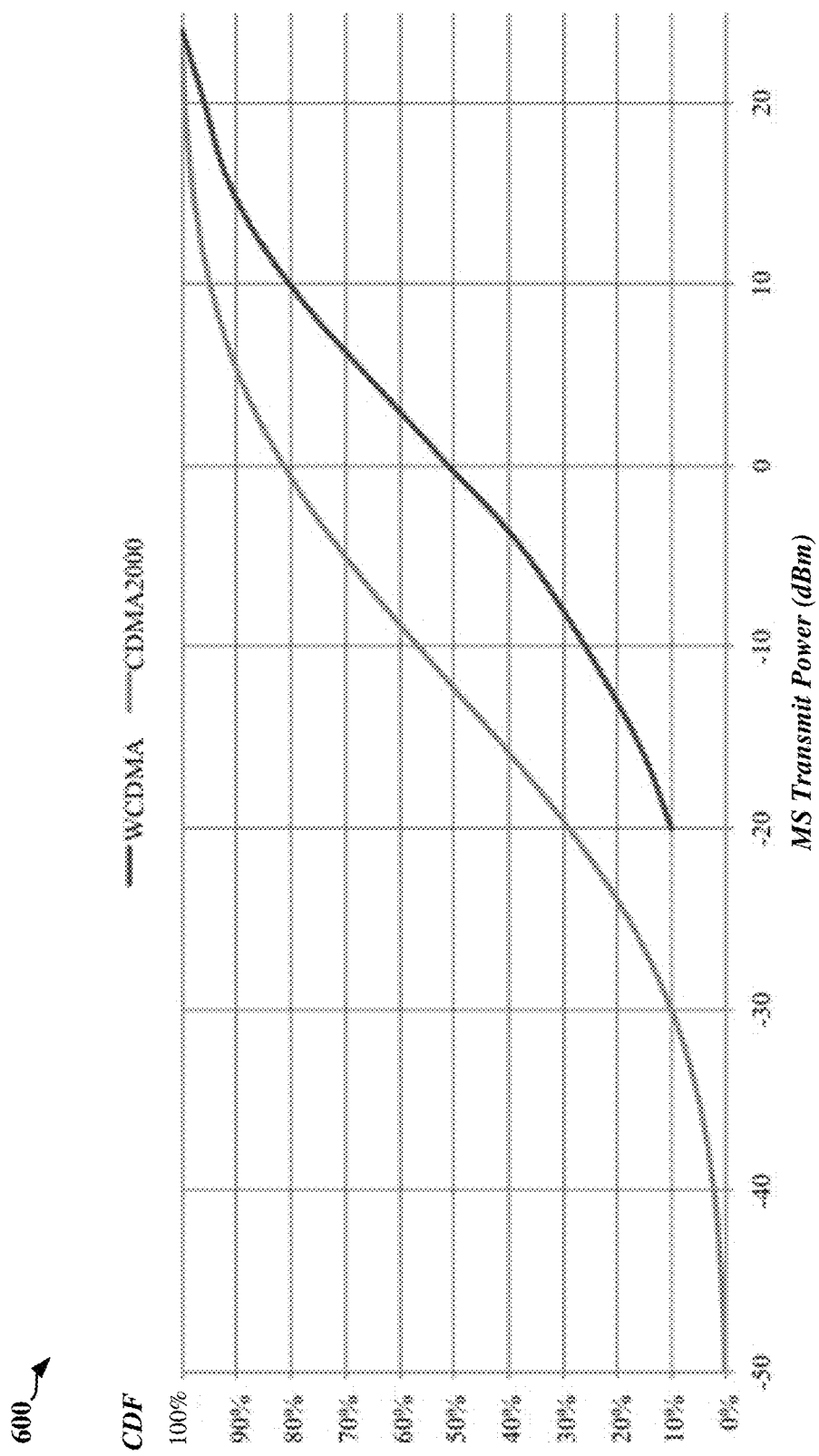
FIG. 6 is a graph illustrating mobile station transmit power for a population of devices.

WANs typically require devices to transmit with sufficiently high power to reach a base station or a small cell that may have a radius of coverage measured in kilometers. In one example, a device may be required to transmit at power levels of 23 dBm or more to reach a base station. FIG. 6 is a graph from the CDMA Development Group illustrating mobile station (MS) transmit power for a population of devices, measured by cumulative distribution function (CDF). It may be observed that the median transmit power required to close a link is approximately −2 dBm or less for most users, but when low power devices incur addition losses e.g., anticipated 20 dB uplink loss from removal of a PA on the device, then almost half of the nodes in a network may be operating at peak power and in some cases unable to close current minimum data rate requirements.

Reducing transmit power required to close a link to 0 dBm, for example, can enable lower power devices to operate in the WAN, but may require long transmissions to close the uplink, which may result in lower overall energy efficiencies than the alternative of using an additional power amplifier. Conventional approaches for connecting low power devices to WANs are fragmented and include different components of unlicensed mesh networks and cellular access.

A managed communication system provided in accordance with certain aspects disclosed herein can efficiently enable direct and mesh networking in support of wide area networks of low-power devices. In the managed communication system, a single reconfigurable radio air interface may be provided for both long-range wireless communications links to a base station and for short-range mesh links between low-power devices. The low-power devices may support one or more RSMA interfaces as described herein. In one example, multiple access may be provided using a low rate channel code, which may be used to encode data over frequency-domain and/or time-domain resources. According to certain aspects, mesh networking may be employed to carry uplink communications from low-power devices, and direct downlink transmissions may be used by a wide area network to transmit data and control information to the low power devices. According to certain aspects, the licensed FDD spectrum may be flexibly used in a managed direct and mesh access environment.

Single Radio Air Interface for Mesh and Direct Links

Figure 7:
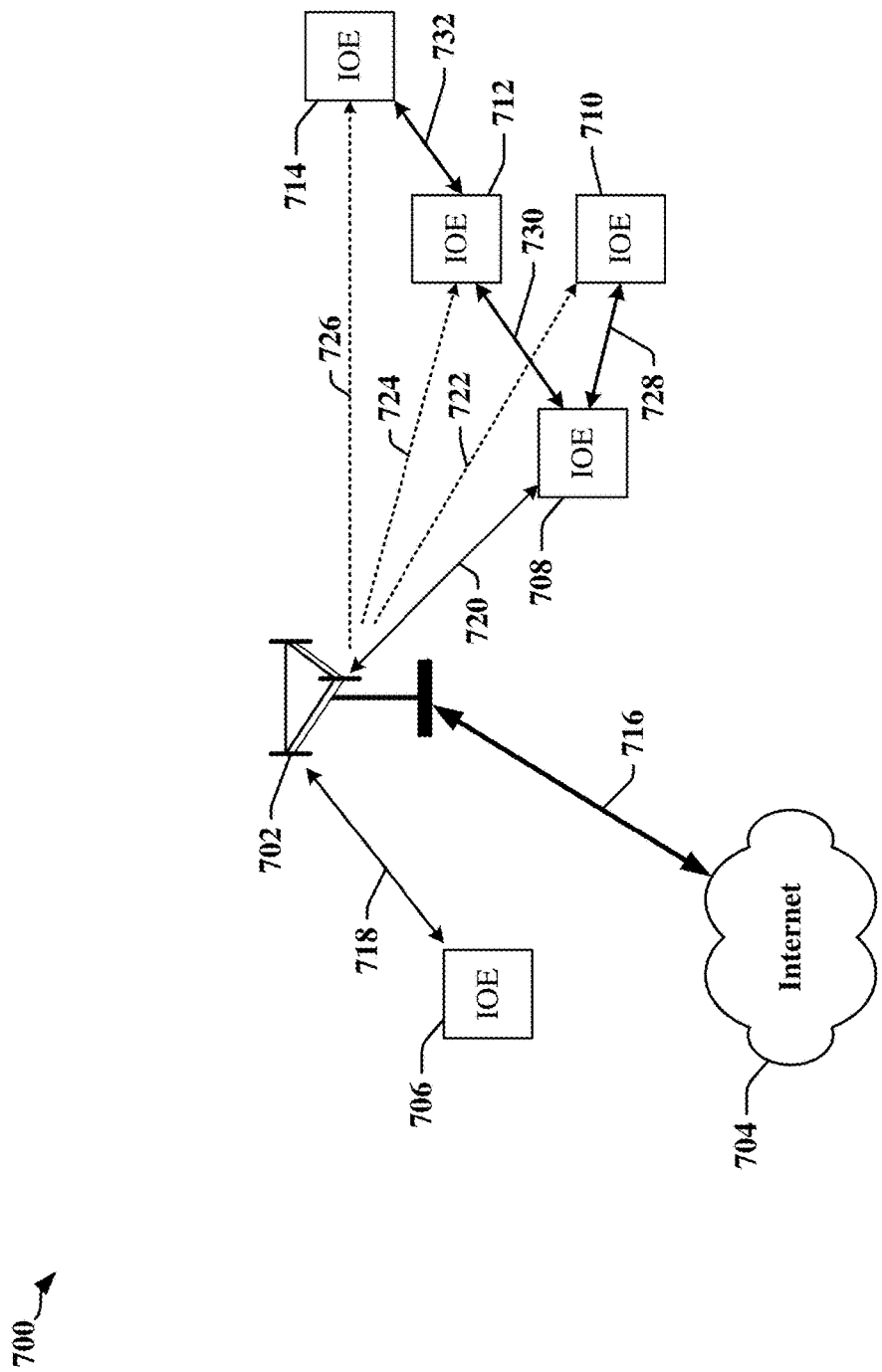
FIG. 7 illustrates an example of a wide area network of low-power devices according to certain aspects disclosed herein.

FIG. 7 is a drawing that illustrates an example of a wide area network of low-power devices 700 that may be configured to use uplink mesh, downlink direct (UMDD) communications in accordance with certain aspects disclosed herein. The wide area network of low-power devices 700 may employ an RSMA scheme adaptable across direct communication links 718, 720 and mesh network connections 728, 730, 732. The wide area network of low-power devices 700 may include the Internet 704 and the wide area network of low-power devices 700 may be referred to as the Internet of Everything (IoE) or Internet of Things (IoT).

A device may be considered a low-power device having a number of features. For example, a device may be a low-power device when it transmits at a power level below a power level threshold that causes or results in its transmissions being ignored by a base station or other entity in a licensed radio access network. Low-power devices may be classified according to their maximum transmit power, which can limit communication range. For example, the IEEE 802.15.4 standard is typically used in networks that have a transmission range of less than 10 meters, and defines a minimum power level of −3 dBm (0.5 mW), with transmission power being limited to 0 dBm (1 mW), 4 dBm (2.5 mW), or 20 dBm (100 mW), according to application. The determination of power-level may be based on an effective radiated power or equivalent radiated power (ERP), or an Effective Isotropic Radiated Power (EIRP). ERP may be understood as a standardized theoretical measurement obtained by calculating system losses and system gains. The EIRP may be employed to take beamforming and other output power concentrating factors into account. In one example, each of a plurality of low-power devices 706, 708, 710, 712, 714 may be referred to as an IoE device, and may have a reduced transmit power of 0 dBm.

In some examples, a device may be considered a low-power device when it transmits at a power level that is calculated or expected to be undetected by scheduling entities and/or other devices in a wide area network. In some examples, the transmission power of a low-power device may be selected to be less than a threshold power level. The threshold power level may be predefined, or configured by a network entity, and/or the threshold power level maybe calculated from measurements and other information received from one or more access terminals, base stations, scheduling entities, or other devices. The threshold power level may be calculated to cause the entity in the wide area network to ignore data transmissions by the low-power device, if the transmissions are received by the entity in the wide area network. In one example, the threshold power level may be calculated as the minimum transmission power level that corresponds to a received power level that is detectable at a scheduling entity, base station or the like. In another example, the threshold power level may be calculated as the minimum transmission power that corresponds to a received power level for signals that are not ignored or filtered by a scheduling entity, base station or the like. In some instances, low-power signals transmitted by a low-power device may be detected by a scheduling entity or other entity in the wide area network. In some instances, a scheduling entity or other entity in the wide area network may treat detected signals transmitted by a first low-power device to a second low power device as interfering signals, and may filter such interfering signals.

Some IoE devices 706, 708 may establish direct uplink and downlink connections 718, 720 with a base station 702. In one example, the IoE devices 708, 708 may connect with the base station 702 using low rate coding over a single-carrier waveform. A multicarrier OFDM variant of RSMA may be employed to support mesh communications between IoE devices 706, 708, 710, 712, 714. RSMA can support unscheduled (asynchronous) transmissions that may reduce latency and on-time of the IoE devices 706, 708, 710, 712, 714.

Direct communications in network 700 can have varying characteristics. For example, uplink communications from meshed IoE devices 710, 712, 714 may be carried through mesh network connections 728, 730, 732 that interconnect directly connected IoE devices 706, 708 with mesh-connected IoE devices 710, 712, 714. The meshed IoE devices 710, 712, 714 may receive direct downlink signals 722, 724, 726 from the base station 702. In the example, one IoE device 708 may serve as an aggregator for other IoE devices 710, 712, 714. An IoE device 708 may be selected as an aggregator based on proximity to a base station 702 and/or another node of the mesh network, power availability, and or after negotiation with other nodes of the mesh network.

The same radio access technology (RAT) may be used in mesh network connections 728, 730, 732 and direct communication links 718, 720. For example, RSMA may provide single-carrier and OFDM variants. The single-carrier variant may be advantageously used for direct communications with a base station 702, while OFDM may be well-suited for a mesh network. In one example, the mesh network connections 728, 730, 732 and the direct communication links 718, 720 may use a spreading code over a single-carrier waveform as one instance of RSMA. The mesh network connections 728, 730, 732 may be scaled and numerically related to the direct communication link 718, 720. In one example, OFDM may be used with a nested timeline and scaled symbol duration. The OFDM variant of RSMA may provide robustness in the presence of collisions, and the symbol size in the OFDM variant may be shorter in time than in the single-carrier variant, here a single-carrier waveform with frequency domain equalization (SCFDE). In one example, the use of OFDM with its smaller symbol sizes enables the IoE devices 706, 708, 710, 712, 714 to process received signals and return to dormant mode more quickly, thereby reducing power consumption. In some instances, multi-hop links 730/732 to an IoE device 714 that pass through multiple IoE devices 708, 712 may be prescheduled to save power.

In some examples, an IoE device 706, 708, 710, 712, 714 may employ a single configurable radio air interface for communicating over a mesh network (mesh waveform) and directly (direct waveform) with a base station 702. A direct waveform (see direct communications links 718, 720) may support large radius networking frequency selectivity. The mesh waveform may support shorter-range mesh network connections 728, 730, 732. The mesh waveform may comply with timelines of the direct waveform. Compliance with the timelines of the direct waveform may include the use of similar or scaled numerologies to obtain a simple re-configured radio and modem. In some instances, compatibility between mesh and direct networks permits IoE devices 706, 708, 710, 712, 714 to demodulate cellular broadcasts efficiently. The single-radio air interface may provide unified multiple access across both direct communications links 718, 720 and mesh network connections 728, 730, 732.

RSMA may spread data and control signaling across resource elements that include time and/or frequency resource elements. When single-carrier RSMA is used, for example, data may be spread across time domain resource elements or chips. In TDD systems, a frame may be divided into slots that are composed of a predefined number of chips. In one example, a 10 ms frame may be divided into 15 slots, each slot having 2560 chips. In OFDM systems, frequency domain resources (sub-channels) and time domain resources may be available for spreading. A single-radio air interface may be configured to switch between single-carrier and OFDM variants of RSMA. The single-radio air interface can minimize RF front-end costs, including in implementations where fewer bands are to be supported. Bandwidth supported may include licensed bands and unlicensed lower bands.

Figure 8:
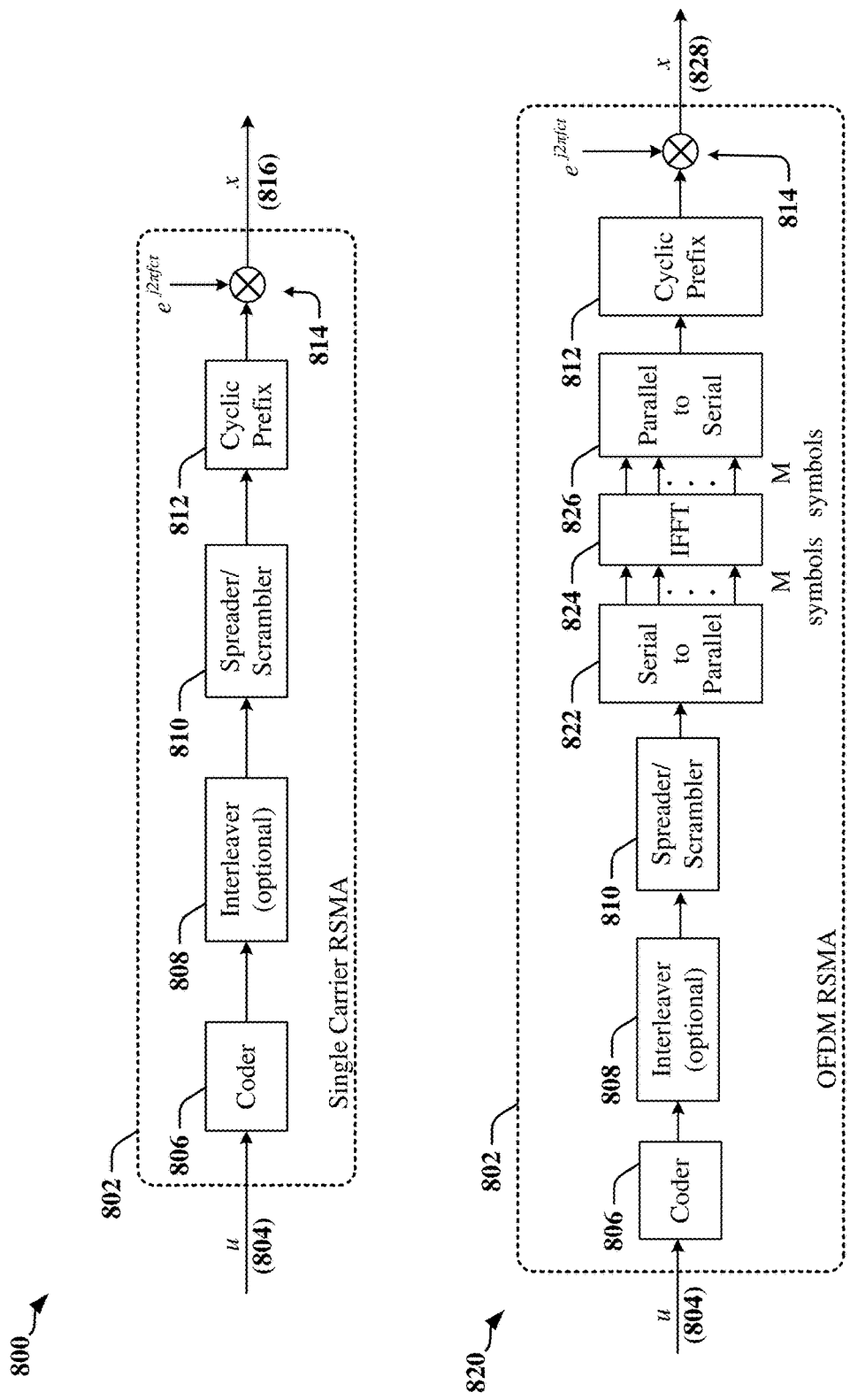
FIG. 8 illustrates the operation of air interfaces used with the single-carrier and OFDM variants of RSMA in accordance with certain aspects disclosed herein.

FIG. 8 illustrates two configurations 800, 820 for a single air interface 802 according to certain aspects disclosed herein. In the first configuration 800, the air interface 802 may be configured for a single-carrier variant of RSMA that spreads coded bits across time domain resource elements. RSMA may be implemented using low rate coding that enables grant-free transmission with reasonable loading characteristics. A single-carrier implementation of RSMA may be characterized by lowered PAPR with respect to multi-carrier implementations. Single-carrier RSMA may be used for communicating with a distant base station, for example. In the first configuration 800, an input 804 of the air interface 802 is provided to a coder 806. The coder may operate at a low code rate where code rate may be defined as the chip rate of a code, and which may be expressed as a number of chips per second at which the code is transmitted or received. The output of the coder 806 is optionally interleaved by an interleaver 808 before spreading by the spreader and/or scrambler 810. A cyclic prefix (CP) is added by a CP module or circuit 812 before the resulting spread signal is up-converted 814 to obtain an output 816.

In the second configuration 820, the air interface 802 may be configured for an OFDM variant of RSMA. The OFDM variant of RSMA may be used for downlink and mesh communications links. The use of OFDM may result in symmetric complexity between transmit and receive chains. For example, fast Fourier transform (FFT) processing and inverse fast Fourier transform (IFFT) processing may be split between the transmit and receive chains, rather than being concentrated in the receiver. OFDM enables single-tap equalization while the use of low rate coding allows for robustness to multiuser interference, such that the strongest signal is decodable. In the second configuration 820, the input 804 of the air interface 802 is provided to the coder 806, and the output of the coder 806 may be optionally provided to the interleaver 808 before spreading by the spreader and/or scrambler 810. In this configuration 820, the signal sequence output by the spreader and/or scrambler 810 is converted to parallel in the serial to parallel convertor 822. This allows for parallel signals to be sent across different sub-channels in the OFDM waveform through suitable processing by the IFFTs 824. The outputs of the IFFTs 824 are provided to a parallel to serial convertor 826 for conversion back to a serial signal. Finally, a CP is added by the CP module or circuit 812, before the resulting frequency-spread signal is up-converted 814 to obtain an output 828.

As illustrated in FIG. 8, a single radio can be configured to support different variants of a coding scheme. A common resource spread coding scheme may be implemented using the coder 806, interleaver 808 and spreader and/or scrambler 810 to feed a "waveform front-end" that operates to spread the coded signal over time or frequency resources. The coding scheme may be a low-density parity-check (LDPC) code or other coding scheme suitable for use in a shared spread spectrum, and/or multipath network. The use of such a low-rate code followed by a configurable modulation stage that can select between OFDM or single-carrier implementations permits a single radio device to support both mesh communications and direct communications with a scheduling entity such as a base station. Equipped with such a radio device, a mobile device deployed in a mesh network may communicate with other devices of its class and more distant base stations.

A radio air interface may be adapted according to certain aspects disclosed herein to enable dynamic reconfiguration of a single radio to support one or more variants of a coding scheme. In one example, a dynamically reconfigurable radio air interface may include circuits and modules that can be combined to communicate using a single-carrier variant of RSMA in a first configuration, and to communicate using an OFDM variant of RSMA in a second configuration. In some examples, the dynamically reconfigurable radio air interface may support different low-rate coding schemes that can be used with different waveforms.

Figure 9:
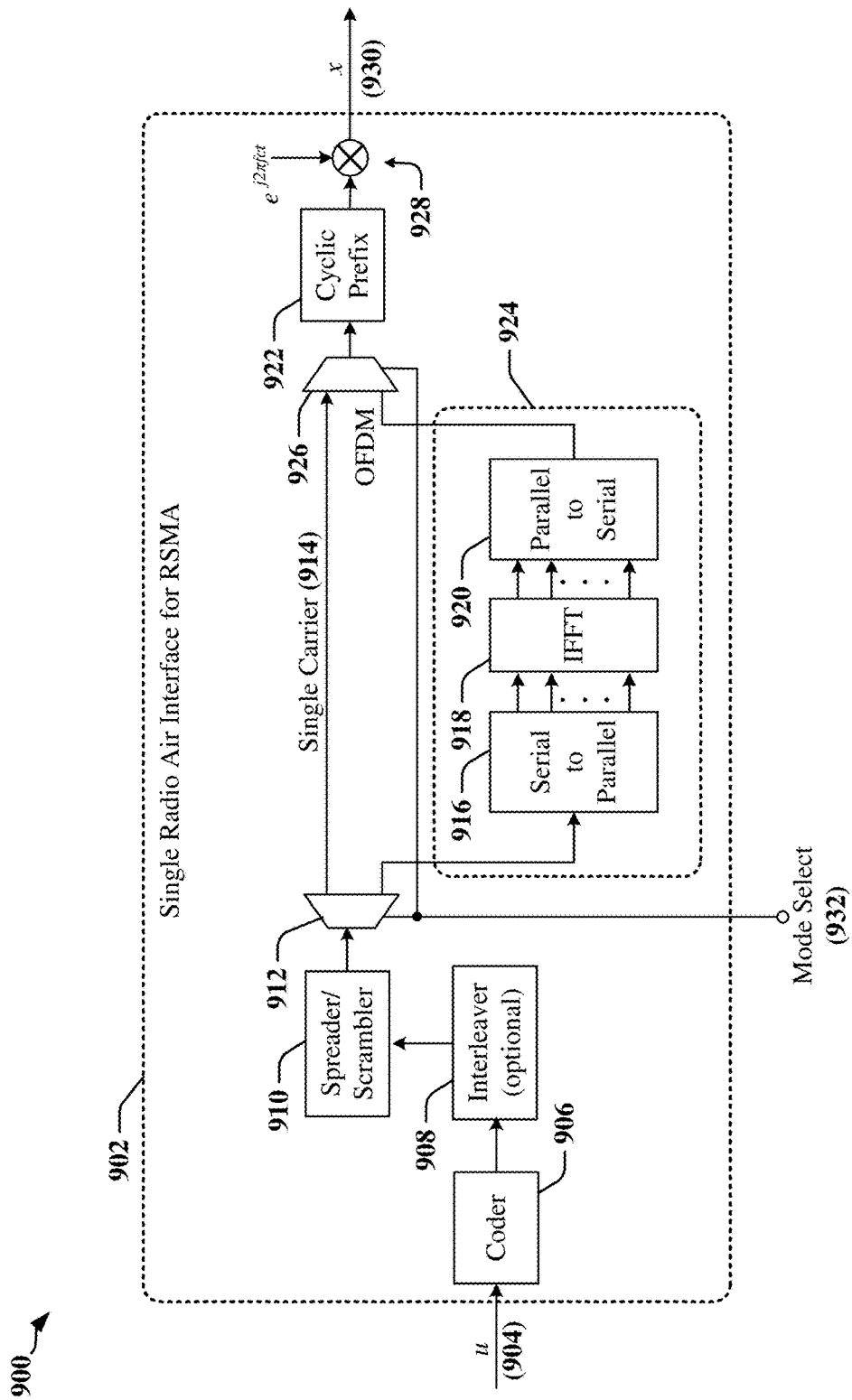
FIG. 9 illustrates the operation of a single radio air interface for single-carrier and OFDM variants of RSMA in accordance with certain aspects disclosed herein.

FIG. 9 is a block schematic diagram 900 that illustrates an example of a single radio air interface 902 used for RSMA with a configurable waveform front-end that may support single-carrier and multi-carrier RSMA. In one example, the air interface 902 may be configured for operation with single-carrier RSMA and OFDM RSMA. The air interface 902 may support single-carrier RSMA in a first mode of operation and multi-carrier RSMA in a second mode of operation. In many instances, hardware, logic and software in an RSMA air interface 902 may be reconfigured and/or reused based on a selected mode of operation.

The RSMA air interface 902 may operate as described generally in relation to FIG. 8 for the single-carrier and multi-carrier RSMA modes of operation. That is, an input 904 of the air interface 902 is provided to a coder 906, which may operate at a low code rate. The output of the coder 906 is optionally interleaved by an interleaver 908 before spreading by the spreader and/or scrambler 910. A cyclic prefix (CP) is added by a CP module or circuit 922 before the resulting spread signal is up-converted 928 to obtain an output 930.

A mode select signal 932 may determine the mode of operation of the RSMA air interface 902. In one example, the mode select signal 932 may control the configuration of hardware, logic and software. In the depicted example, the mode select signal 932 may control the operation of multiplexing, de-multiplexing, and/or switching logic 912, 926. The mode select signal 932 may control the multiplexing, de-multiplexing, and/or switching logic 912, 926 such that OFDM circuits and modules 924 are inserted into the processing chain of the air interface 902 in the second mode of operation.

The mode select signal 932 may be used to switch between modes of operation of the RSMA air interface 902 in accordance with one or more schedules and/or application needs. In one example, a communication device equipped with the RSMA air interface 902 may receive scheduling information from a scheduling entity of a WAN. The mode select signal 932 may be controlled by a processor, controller, processing circuit, state machine or sequencer in accordance with the scheduling information received from the scheduling entity of the WAN such that the RSMA air interface 902 is configured for the first mode of operation at those times specified by the scheduling information when the communication device is expected to listen or otherwise communicate on the WAN. In another example, an application processor may operate the mode select signal 932 to select the first mode of operation in order to search for, or connect to a WAN. In yet another example, an application processor may operate the mode select signal 932 to select the second mode of operation while communicating over a mesh network.

In operation, a processing circuit or other controller may maintain a schedule that includes one or more of a predetermined schedule, scheduling information received from a scheduling entity of a wide area network, scheduling information received or generated based on mesh network communications, and/or from another source. The processing circuit may dynamically reconfigure the RSMA air interface 902 in accordance with the scheduling information. The processing circuit may reconfigure the RSMA air interface 902 by setting a value for the mode select signal 932 at certain events defined by the scheduling information. In one example, the scheduling information may identify a first set of time intervals when the RSMA air interface 902 is to be used for communicating with the WAN, and the processing circuit may set the value of the mode select signal 932 such that the RSMA air interface 902 transmits using a single carrier waveform. In another example, a second set of time intervals may be identified from the scheduling information when the RSMA air interface 902 can be used for communicating with the mesh network, and the processing circuit may set the value of the mode select signal 932 such that the RSMA air interface 902 transmits using an OFDM waveform. The second set of time intervals may include one or more from time intervals that are not included in the first set of time intervals. The second set of time intervals may be negotiated or determined through mesh network protocols.

The RSMA air interface 902 may be configured for other modes of operation. For example, the radio air interface 902 may operate in a third mode of operation in which a combination of single-carrier and multi-carrier schemes may be utilized to carry data between two or more entities using both a single-carrier RSMA connection and an OFDM RSMA connection. In the third mode of operation, the mode select signal 932 may control the multiplexing, de-multiplexing, and/or switching logic 912, 926 to provide a first portion of the spread coded data (output by the spreader and/or scrambler 910) to the single-carrier path 914 and a second portion to the OFDM circuits and modules 924. The radio air interface 902 may be configured to spread data over a combination of time-domain resources and frequency-domain resources in the third mode of operation. The third mode of operation may support certain types of communication with one or more base stations and/or with one or more devices in a mesh network.

Figure 10:
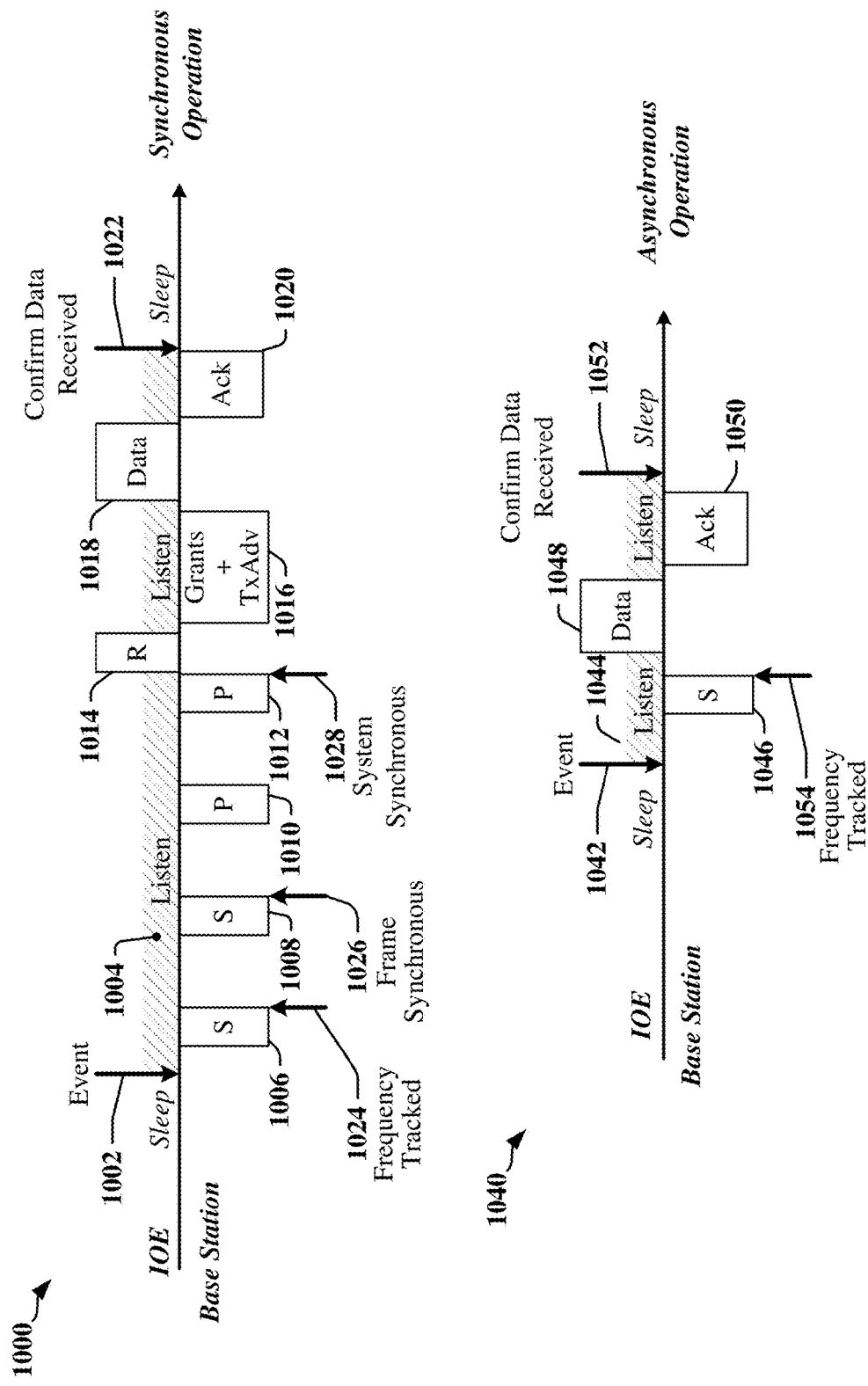
FIG. 10 illustrates certain aspects of the use of relaxed uplink synchronism.

According to certain aspects, the use of asynchronous RSMA can improve the performance of IoE devices by providing low-power, low-latency direct links between IoE devices and a base station. FIG. 10 includes timing diagrams 1000 and 1040 that illustrate certain advantages of using relaxed uplink synchronism, including shortened cold starts after large timing drifts associated with IoE devices that are not constantly synchronized with the base station. In some examples, significant timing drifts may occur after time periods of 10 seconds or more, when the internal clock of the IoE device has a specified tolerance of 100 parts per million (ppm) clock. In one example, asynchronous RSMA may allow uplink transmissions for small payloads and data rates without an exchange of request and grant messages. Longer transactions may require re-transmission and closed loop power control. Downlink communications remain synchronous to provide a general timing reference. IoE devices need not be configured for transmit advance protocols prior to any uplink transmissions.

In FIG. 10, a first timing diagram 1000 illustrates conventional synchronous operation. An IoE may detect an event 1002 that causes the IoE to generate event information to be transmitted to the network. The event may be internal or external and may be generated by a timer, for example. The IoE commences a listening period 1004 during which the IoE may acquire network synchronization information 1006, 1008. The network synchronization information 1006, 1008 may relate to frequency tracking synchronization 1024 and frame synchronization 1026. The IoE may also receive control information including parameters transmitted in broadcasts 1010, 1012 that enable the IoE to acquire system synchronization 1028. The IoE may then transmit a request message 1014 and receive one or more response messages 1016 that may include a grant of resources and timing advance information. The IoE may then transmit the event information in one or more data transmissions 1018 on the uplink, and the base station may receive the data. The IoE may wait for acknowledgement 1020 of receipt of the data transmission before determining that the event information has been properly received at which point the IoE device can sleep 1022.

FIG. 10 includes a second timing diagram 1040 that illustrates the operation of an asynchronous RSMA link. Here, the IoE may enter a listening period 1044 after detecting an event 1042. When the IoE has acquired frequency-tracking synchronization 1054 based on a downlink transmission 1046, the IoE may transmit the event information in one or more data transmissions 1048 on the uplink, and the base station may receive the data. The IoE may then wait for acknowledgement 1052 of receipt of the data transmission before determining that the event information has been properly received. Accordingly, the transaction triggered by the event 1042 in an asynchronous RSMA system may require significantly less time to process than a similar event 1002 on a synchronous system. Collisions may occur at the base station during a period during which an asynchronous transmission from a different IoE is received (e.g., data transmissions 1048). The period may be related to or calculated based on differences in propagation delay for the two IoE devices.

A single radio air interface 902 used for RSMA may maintain a wireless connection with a scheduling entity of a licensed wireless access network concurrently with one or more mesh network connections. In one example disclosed herein, scheduling information received from the licensed wireless access network may be used for scheduling communications within the mesh network. Accordingly, a device may schedule mesh communications in timeslots when the device is not involved in communication with the licensed wireless access network. In this mode, the resource spreading scheme employed by wireless device may be regarded as spreading data over both time-domain and frequency-domain resources when communicating on the mesh network.

In some instances, a device may maintain a wireless connection with a scheduling entity of a licensed wireless access network concurrently with one or more mesh network connections when the schedules of the licensed wireless access network and the mesh network are uncoordinated and/or unsynchronized. In these instances, collisions may occur in which the device is simultaneous scheduled to communicate on both the licensed wireless access network and the mesh network. When a collision occurs, the device may selectively provide access to the radio interface for applications communicating on one of the networks and deny access to another application communicating on the other network. A network may be selected for access based on priority, nature of the network, quality of service requirements, power budget, and for other reasons. In one example, access to the licensed wireless access network may be selected when there is a high probability that a connection between the device and the licensed wireless access network may be broken, and where reestablishing such connection may consume significant time and bandwidth resources and/or system power. In another example, access may be denied to the application communicating over the more resilient network connection. That is, access to the radio air interface may be granted for communications over a network connection that is less resilient, and where for example a retransmission scheme is supported for the more resilient network connection. In another example, communications with the licensed wireless access network may be granted access when the mesh network operates in an ad hoc, or connectionless manner.

According to certain aspects, RSMA uplink multiple access designs may be flexible in providing for the number of access terminals supported. The flexibility may be provided with less overhead and scheduling latency. Moreover, RSMA may be characterized by good performance for channels that have low signal-to-noise ratios (SNRs) and tight rise over thermal (RoT) control. RoT is related to the ratio of total interference received at the base station and thermal noise.

According to certain aspects, the UE in RSMA networks may be pre-registered and a signature sequence can be assigned. The signature sequence may include a scrambling code, interleaving pattern, etc. The transmit frequency band to be used by the UE may be specified. In some instances, a target wakeup time may be scheduled in order to more uniformly and/or effectively distribute traffic in the time domain.

In operation, the UE employs open-loop power control upon wakeup where, for example, the UE may measure downlink received power to determine the uplink transit power. The UE may then switch to closed-loop power control during data transmission.

Figure 11:
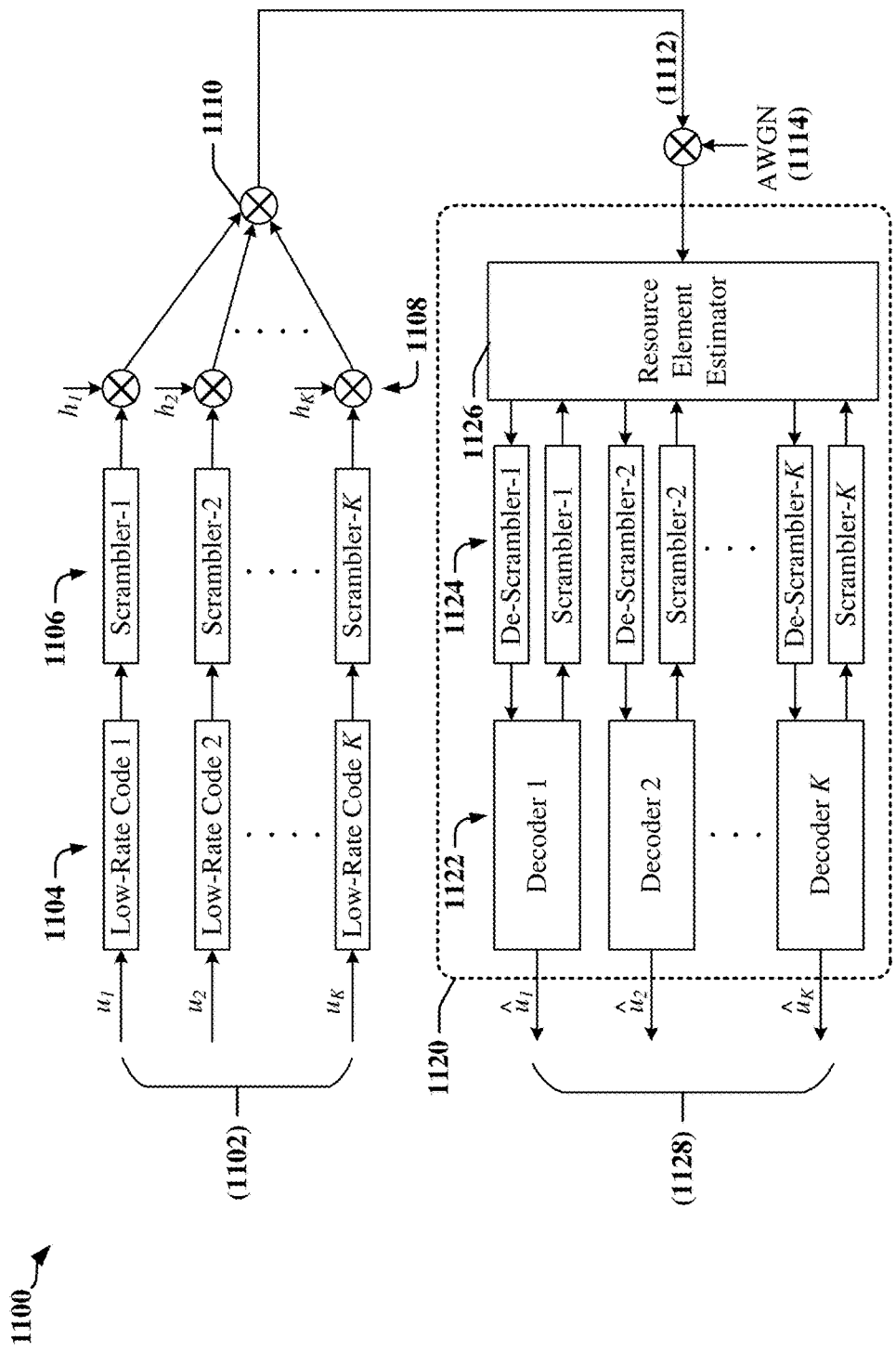
FIG. 11 illustrates an apparatus that implements an example of a multi-user detection (MUD) scheme.

According to certain aspects, one or more multi-user detection (MUD) schemes may be employed. MUD schemes may employ one or more approaches including, for example, approaches that treat interference as noise, perform successive interference cancellation, and/or joint-iterative decoding (see FIG. 11). Some RATs, including 5G RATs may enable all approaches. The MUD schemes may be applied to both direct links and mesh links. Some MUD approaches may provide improved detection when substantial jitter is present.

According to certain aspects, provisions may be made for differences between communications related to access channels and communications involving traffic channels. Access channels are typically less power-controlled than traffic channels. In some instances, high-power access channel probes that have been decoded prior to traffic channel decoding may be cancelled. In some instances, access channels can be revisited after additional traffic channel decoding and cancellation has been performed.

According to certain aspects, an uplink access probe may include a preamble and certain identifying information. The preamble and identifying information may be separated in the time domain, with the preamble being transmitted before transmission of the identifying information is commenced. The identifying information may include a unique device identifier (device ID) of the IoE, a code and/or modulation format, and a format of the pilot sequence. The identifying information may be selected using open-loop power control. In some instances, the identifying information and/or preamble can be jointly encoded using, for example, a tail-biting code and repetition.

According to certain aspects, a traffic slot structure may be defined for use in uplink, downlink, and mesh transmissions. In one example, a single-carrier pilot, control, and/or traffic channels may be time-division multiplexed where the same transmit power is maintained over a packet frame. This type of traffic slot structure may provide a lower PAPR through BPSK, QPSK, and/or 8-PSK modulation and variants thereof. A pilot may be transmitted mid-amble, although it may be less convenient to process two discontinuous data bursts in some implementations.

In another example, OFDM pilot, control, and/or traffic channels may be time-division multiplexed and frequency-division multiplexed over a packet frame. Under this approach, better sensitivity modulation and/or demodulation can be achieved, albeit at a higher PAPR.

In some instances, the traffic-to-pilot resource ratio can be adjusted based on a desired operating point. A data and/or control channel may be encoded using a low-rate FEC code, such as a low-rate LDPC code or a turbo code, to achieve a high coding gain and consequently a reduction in required transmit power.

According to certain aspects, demodulation complexity may be reduced to save power. For example, simplified antenna diversity may be supported or antenna diversity may not be supported. The number of HARQ transmissions may be reduced, or error control may rely on ARQ.

Certain power-saving options may be available with respect to channel coding. For example, LDPC may be employed with simplified decoders. The iterative decoding message bit-widths and node functions may be scaled down and/or decoding can be performed with a bit-flipping algorithm for all bit operations. These power-saving methodologies and techniques may compare well with traditional techniques such as convolutional or Reed Solomon encoding techniques.

In some examples, a unified design of air-interface supports direct and mesh links with single radio. The links may use the same waveform and/or related or scaled numerologies between links to reduce complexity. Down-scaling of complexity may be provided to reduce power on short-range links.

In some examples, an adaptable RSMA scheme is employed across mesh and direct networks. RSMA may be used with information and overhead bits spread across time/frequency resources. RSMA may be applied to both single-carrier and multi-carrier (e.g., OFDM) waveforms with minor modifications.

In some examples, any combination of scrambling, spreading, and interleaving may be included. Time division of pilot and control may be supported to reduce PAPR in a single-carrier waveform.

Uplink Mesh/Downlink Direct Transmissions for IoE Device Networks

As discussed elsewhere herein, networks of IoE devices configured to communicate using RSMA may include IoE devices that have insufficient transmit power IoE to close the uplink connection. For example, IoE devices may have transmit power in the vicinity of 0 dBm. For the purposes of this discussion, it can be assumed that a base station is located within range of the IoE devices such that the downlink can be received at the IoE devices with sufficient power to enable efficient decoding by the IoE devices. Certain aspects disclosed herein provide systems, apparatus and methods that enable timing within a mesh network to be aligned, synchronized and/or coordinated with timing defined for a radio access network by a base station or other network entity. In some examples, a first device and second device in a mesh network can synchronize their timing when the first and second devices are out of range of one another by basing mesh network timing on base station synchronization signals. Certain aspects disclosed herein provide systems, apparatus and methods that enable an IoE mesh to close the uplink connection.

Figure 12:
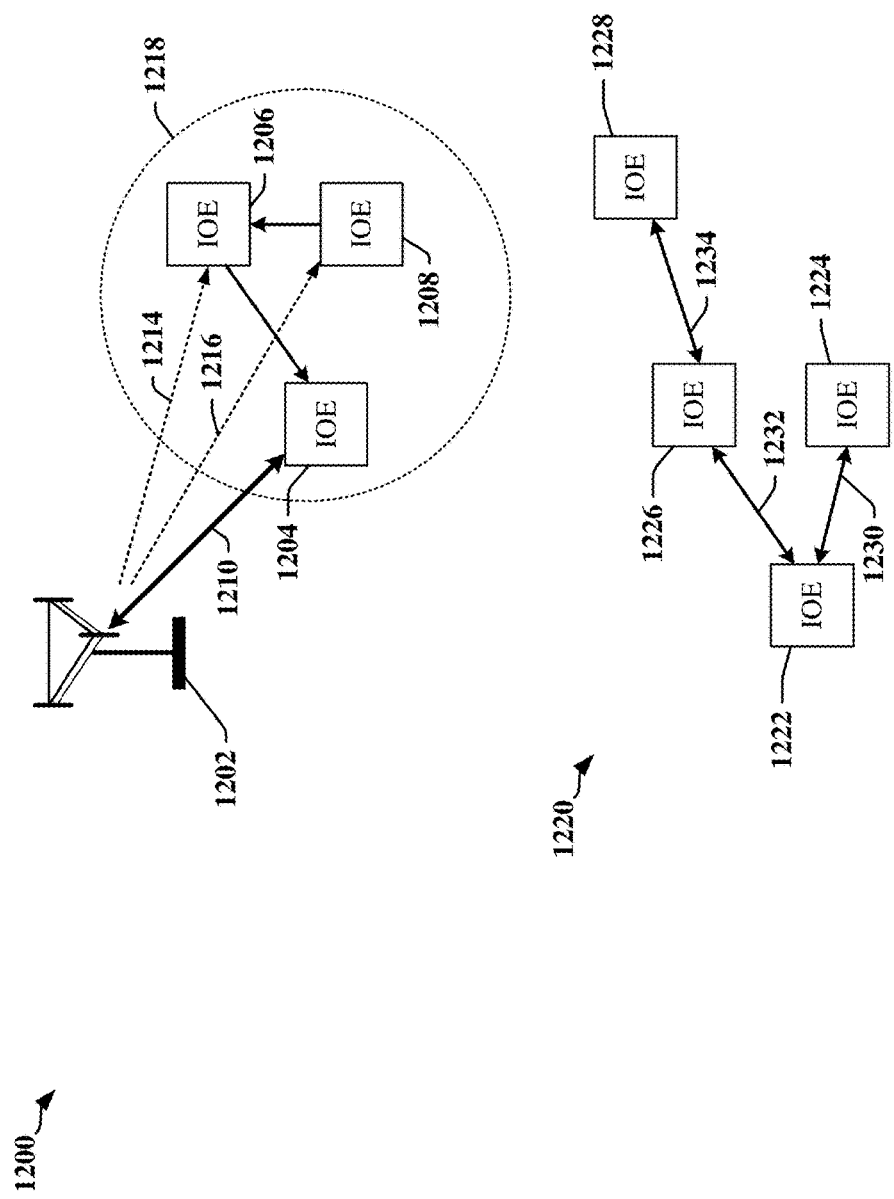
FIG. 12 illustrates a mesh network of low-power devices provided in a network subscriber domain in accordance with certain aspects disclosed herein.

FIG. 12 includes a diagram 1200 that illustrates a mesh network 1218 of IoE devices 1204, 1206, and 1208. A base station 1202 may provide downlink channels that can be received by the IoE devices 1204, 1206, and 1208. In the example, at least one IoE device 1204 has established an uplink connection 1210 with the base station 1202. Each of the IoE devices 1204, 1206, and 1208 may monitor downlink transmission 1214, 1216 from the base station 1202. In the example, two IoE devices 1206, 1208 communicate on the uplink using the aggregator IoE device 1204.

According to certain aspects, the downlink frequencies may be used for discovery and coordination in the mesh network 1218. The IoE devices 1204, 1206, and 1208 may include power constrained and/or plugged-in aggregators.

FIG. 12 includes a mesh network subscriber domain 1220 that illustrates certain aspects related to discovery, connectivity, and traffic in the subscriber domain 1220, including certain aspects related to subscriber domains and opportunistic relays. The subscriber domain 1220 may include a plurality of IoE devices that includes the IoE devices 1222, 1224, 1226, and 1228. The IoE devices 1222, 1224, 1226, and 1228 may include power constrained and/or plugged-in aggregators.

IoE device discovery procedures in the subscriber domain 1220 may be performed using broadcasts of very short messages and/or signals. In one example, the short messages may include between 10 and 100 bytes, and these messages may advertise communication services associated with one or more of the IoE devices 1222, 1224, 1226, 1228. The communication services may include relay, aggregator, and/or access services. The very short messages may be used to propagate system configuration and/or to provide signals used for synchronization. A discovery subsystem configured for the subscriber domain 1220 may operate according to a predefined time scale. In one example, the discovery subsystem time scale may be measured in seconds, tens of seconds or minutes for static IoE devices 1222, 1224, 1226, 1228.

Discovery may be performed in one of a variety of available modes. In one example, the IoE devices 1222, 1224, 1226, 1228 may be configured to support a pull mode, in which discovery operates based on messages provided in response to transmitted queries. In another example, the IoE devices 1222, 1224, 1226, 1228 may be configured to support a push mode, in which the IoE devices 1222, 1224, 1226, 1228 transmit advertisements periodically in accordance with a schedule or schedules defined or configured for the IoE devices 1222, 1224, 1226, 1228.

According to certain aspects, discovery may be performed in a multi-hop mode, whereby advertisements may be relayed by one or more IoE devices 1222, 1224, 1226, 1228 in the subscriber domain 1220. The discovery process may be configurable and flexible, permitting a range of payloads and ranges, which may be measured in the number of hops between IoE devices 1222, 1224, 1226, 1228 in the subscriber domain 1220.

With regard to the mesh waveform, a basic unit for discovery messages may include one or two resource blocks (RBs) transmitted in one millisecond periods. For an OFDM variant of RSMA, discovery signaling may include a preamble that may be similar to a sounding reference signal (SRS) preamble.

Figure 13:
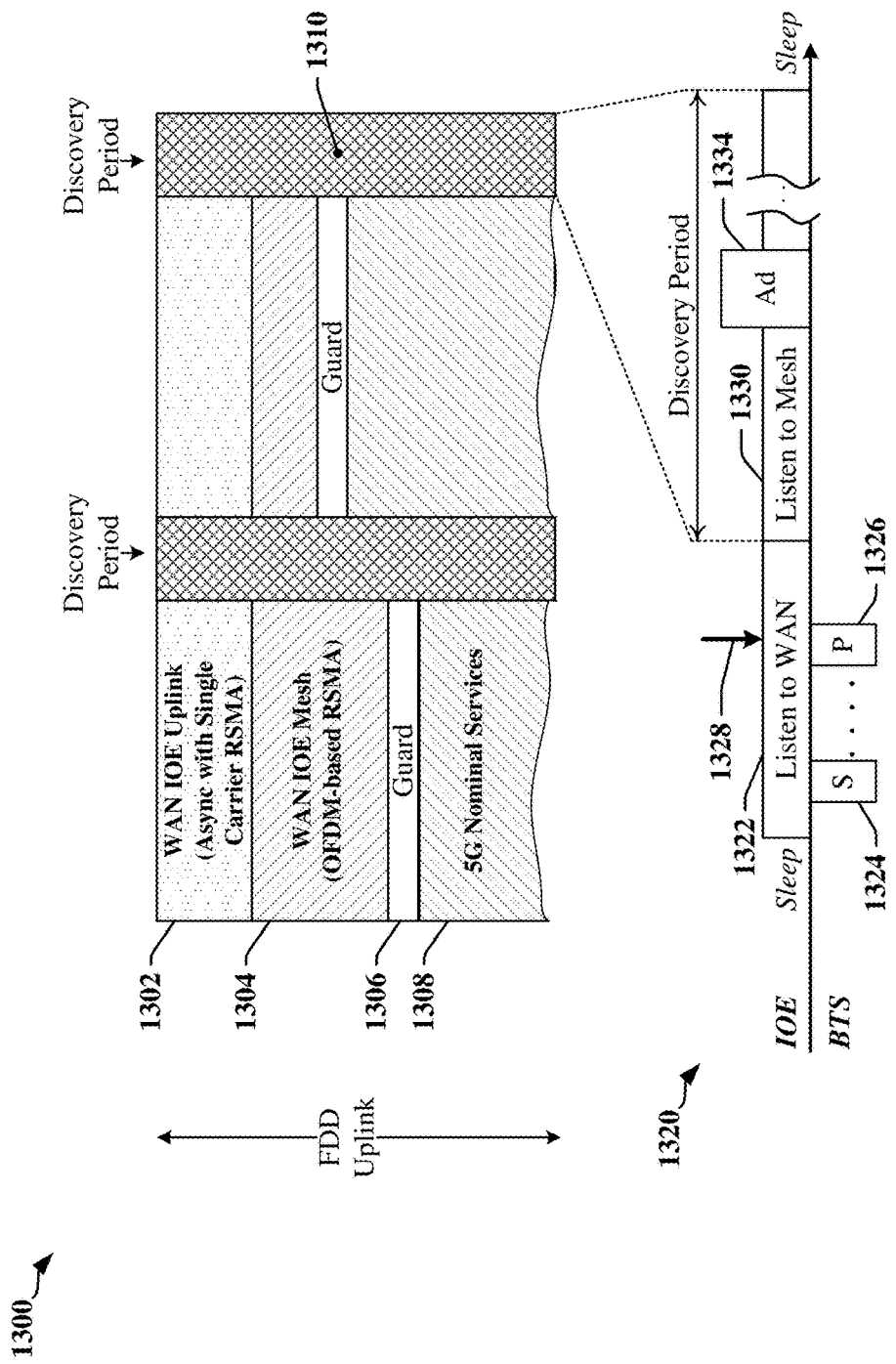
FIG. 13 illustrates spectrum allocation for a mesh network of low-power device and an example of timing for low-power device discovery in a mesh network in accordance with certain aspects disclosed herein.

FIG. 13, with continued reference to FIG. 12, illustrates spectrum allocation 1300 for an IoE mesh and an example of a timing diagram 1320 corresponding to IoE mesh discovery processes. The spectrum may include frequencies 1302 assigned for WAN IoE uplink asynchronous RSMA, frequencies 1304 assigned for WAN IoE TDD mesh and burst access, and frequencies 1308 reserved for 5G nominal services. A guard band may separate the 5G nominal services frequencies 1308 from the mesh-related frequencies 1302, 1304. During the discovery period 1310, the IoE devices 1222, 1224, 1226, 1228 may listen 1330 to mesh signaling and may suspend listening 1322 to WAN signaling. The discovery period may be initiated by a triggering event, which may be periodic in nature.

The timing diagram 1320 corresponds to a discovery period 1310. The duration, periodicity and other characteristics of the discovery period 1310 may be provided in a broadcast control message. Each node of an IoE mesh network subscriber domain 1220, including the IoE devices 1222, 1224, 1226, 1228, may be temporally aligned in accordance with WAN synchronization signals 1324 and, in at least some instances, WAN parameters 1326. For example, certain operations of the radio air interface may be temporally aligned in accordance with WAN synchronization signals. At some point during the discovery period 1310, an IoE device 1222, 1224, 1226, 1228 may transmit an advertisement 1334. Each IoE device 1222, 1224, 1226, 1228 may be configured to transmit its advertisement at a different time, or at some random time. The discovery process may benefit from use of the RSMA OFDM waveform, since the discovery period involves transmission and reception among IoE devices. The RSMA OFDM waveform may additionally incorporate a subset of resources onto which information can be spread.

Discovery may employ distributed resource allocation. Collision detection and handling may be implemented. In one example, a slotted ALOHA methodology may be followed, in which the strongest IoE device 1222, 1224, 1226, 1228 prevails. Responses may be provided as a slave to the query. The process may include semi-persistent selection with collision detection.

After discovery, connections of the IoE mesh network 1218 may be configured. A connection may be established between two or more end nodes, where the end nodes may include the IoE devices 1222, 1224, 1226, 1228. In addition path selections may be configured for each of the IoE devices 1222, 1224, 1226, 1228. For WAN traffic, a single-hop or multi-hop path may be selected. The path is typically maintained by participating nodes. The integrity of the path may be checked and/or confirmed periodically. If path integrity is in question, if the path has failed, or if a better path is discovered, then the established path may be switched for a different path. According to certain aspects, Connectivity operates on a faster time scale than discovery.

Figure 14:
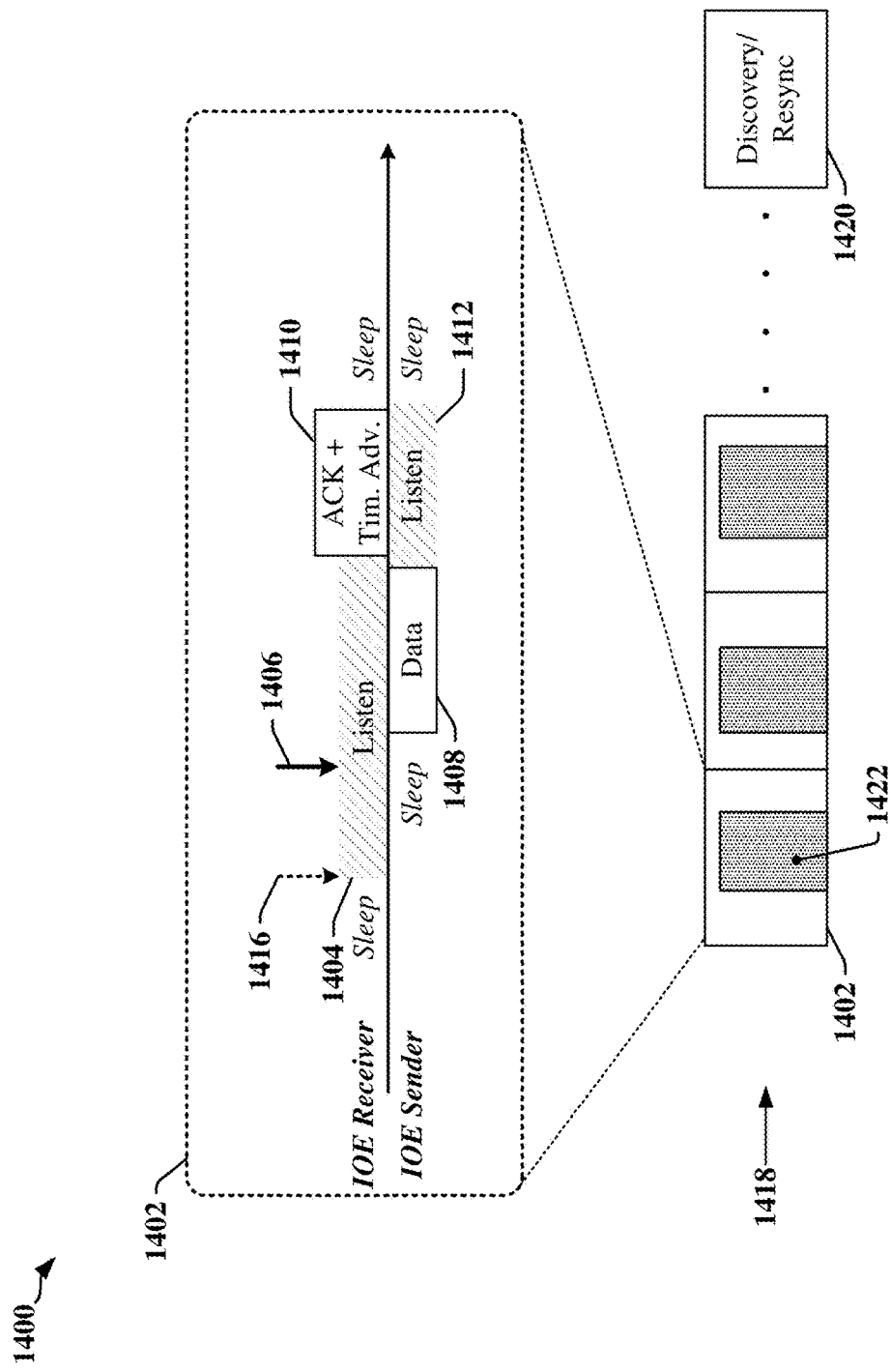
FIG. 14 illustrates per-hop traffic transactions in a mesh network of low-power devices.

FIG. 14 is a diagram 1400 illustrating per-hop IoE mesh traffic transactions. Semi-persistent scheduling may be applied for stationary or low mobility nodes and synchronization within the mesh may be relaxed with respect to WAN-level synchronization.

According to certain aspects, traffic transactions occur within a series of windows 1418. Each window 1402 may be sized to accommodate clock drifts and to allow sufficient time for the transaction interval 1422 in which synchronization and exchange of data may occur. In one example, each IoE device 1222, 1224, 1226, 1228 may be configured with a schedule that identifies a scheduled time 1406 for the IoE device 1222, 1224, 1226, 1228 to wake up and begin a listening period 1404 on the mesh network 1218. Typically, the IoE device 1222, 1224, 1226, 1228 may set or be configured to execute an early wakeup time 1416 such that clock drift can be accommodated. It will be appreciated that even with the early wakeup time 1416, the IoE device 1222, 1224, 1226, 1228 may wake up late, but typically within the margins permitted by the schedule. Aggregated clock drifts can be managed by timing advance information sent with an ACK 1410, for example. WAN synchronization may be performed in some instances, including when overhead in power level is favorable for a WAN re-sync.

Figure 15:
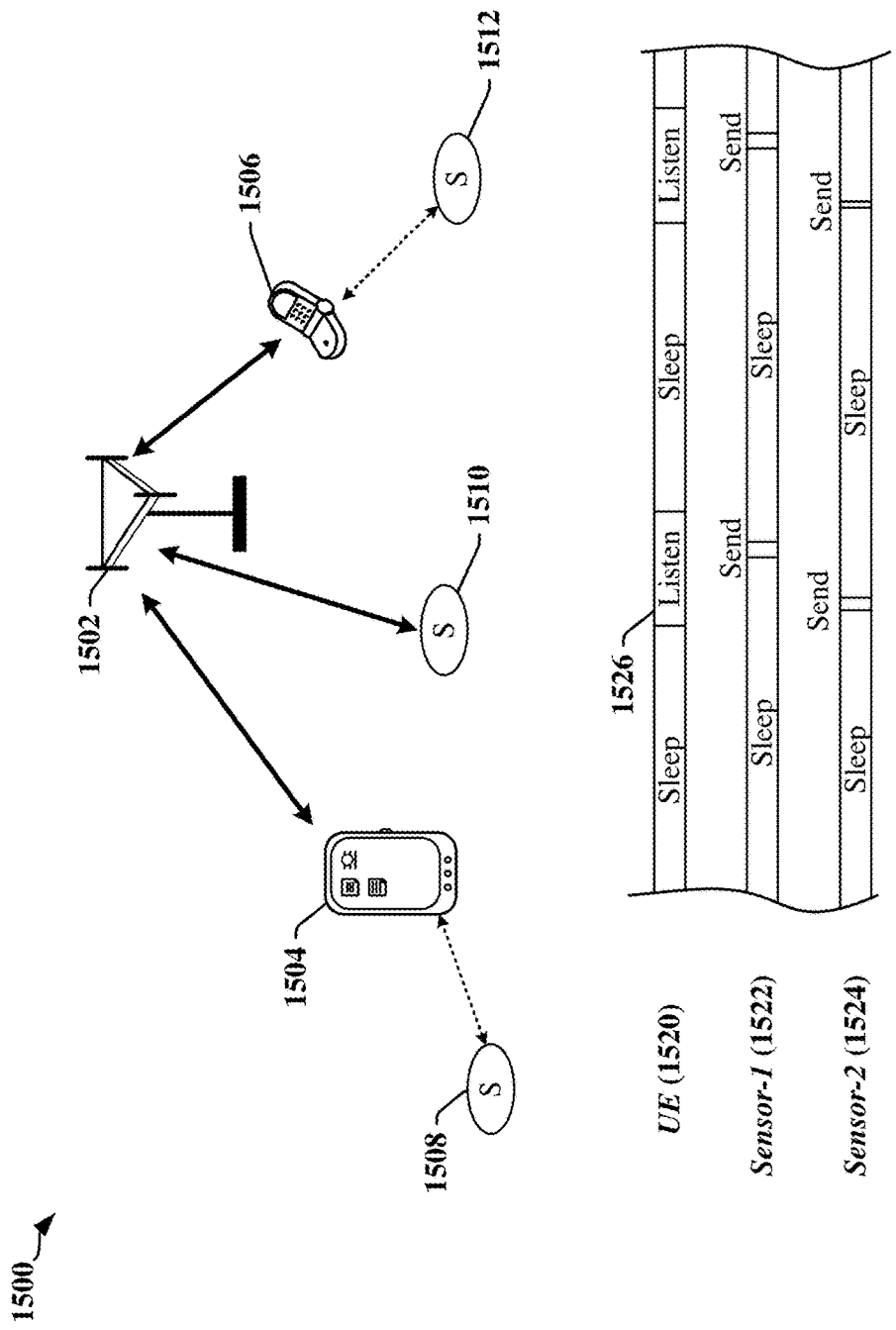
FIG. 15 illustrates a network of low-power devices that may employ opportunistic relaying in accordance with certain aspects disclosed herein.

FIG. 15 is a diagram 1500 illustrating an IoE network that may employ opportunistic UE relaying. IoE device may include sensors (S) 1508, 1510, 1512. One or more sensors 1510 may have closed an uplink link to a base station 1502. The sensors 1508, 1510, 1512 may be configured in a mesh network as disclosed herein. In some examples, the sensors 1508, 1510, 1512 may communicate opportunistically with the base station 1502. For example, a first sensor 1508 may relay information through a first UE 1504 while a second sensor 1512 may relay information through a second UE 1506, where the UEs 1504, 1506 may be passing in proximity to the sensors 1508, 1512.

A power-efficient discovery mechanism may be employed for opportunistic UE relay. Discovery may be performed using narrowband communications. A UE 1520 may listen during a discovery window 1526. Each sensor 1522, 1524 may transmit data in a preconfigured or random slot during the discovery window 1526. A UE 1520 that receives the transmission from one or more sensors 1522, 1524 may be configured to transmit the received data instantaneously, or as soon as possible, and process ACKs on the uplink and downlink for the WAN and the one or more sensors 1522, 1524. In some instances, the UE 1520 may aggregate UL data from multiple sensors 1522, 1524 before delivering the aggregated data to the WAN. Accordingly, there may be a delay between transmission of the uplink data by the sensors 1522, 1524 and delivery to the WAN. Upon receipt of the aggregated data, the WAN may broadcast an ACK on the WAN downlink to the sensors 1522, 1524.

Opportunistic UE relaying may be associated with a security mechanism. A relay UE 1504, 1506 and sensors 1508, 1512 may authenticate each other using a network operator-signed embedded certificate. This security mechanism may incur significant processing and signaling overhead. Accordingly, in at least some instances, no security procedures are implemented between relay and sensor and other mechanisms may be employed to avoid potential vulnerability and/or damages.

Figure 16:
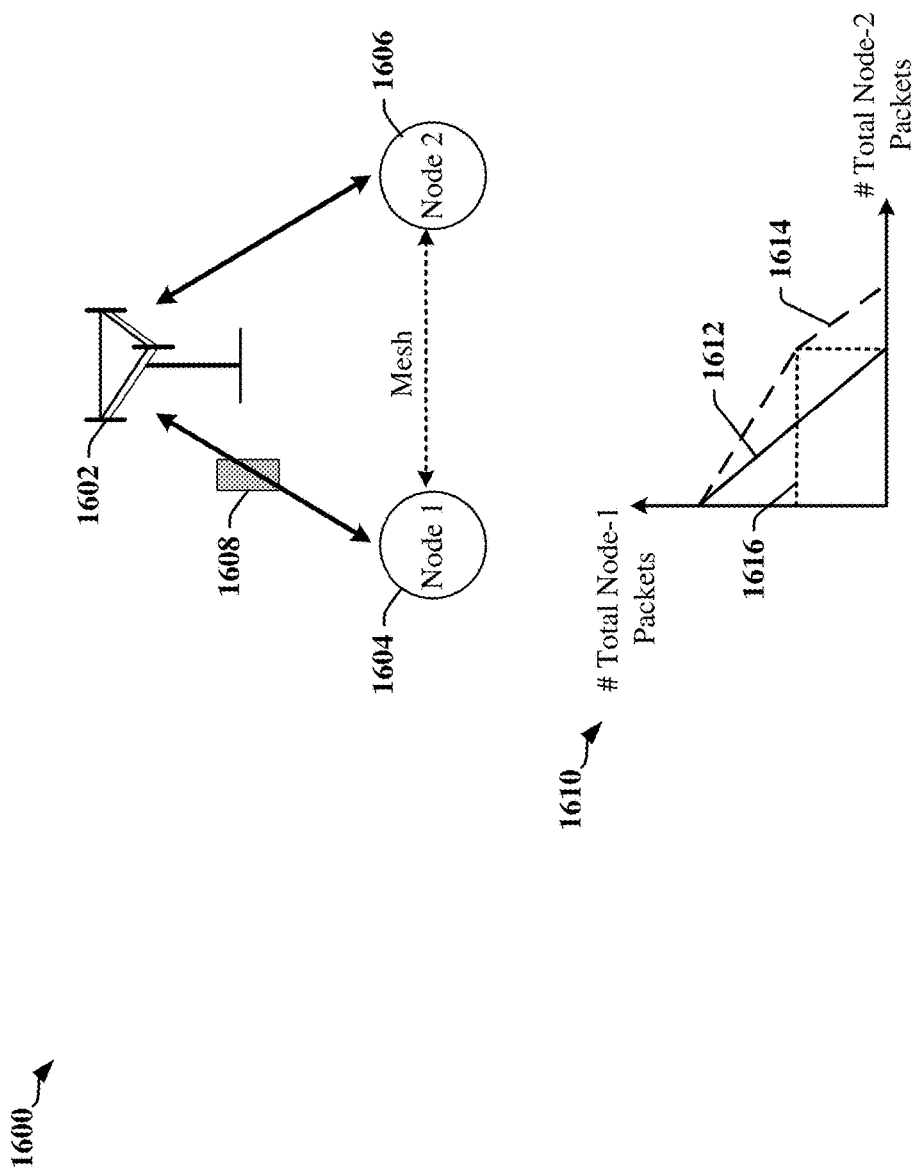
FIG. 16 illustrates network performance related to communication options for low-power devices in accordance with certain aspects disclosed herein.

With reference to FIG. 16, certain advantages and benefits may be attributed to systems, apparatus and methods adapted according to certain aspects disclosed herein. In one example, extended coverage and potentially more uniform power consumption may be provided across the network. In the example, a network may include a base station 1602 and two or more nodes 1604, 1606. The connection between a first node 1604 and the base station may be impaired by shadowing 1608, such that the shadowing 1608 degrades the direct link between the first node 1604 and the base station 1602 by X dB relative to the second node 1606. In this example, the first node 1604 may selectively communicate with the base station 1602 through the mesh network and the second node 1606.

The graph 1610 illustrates network performance for various communication options. A first curve 1612 represents communication in which the second node 1606 operates as an aggregator, and the number of packets transmitted by the first node 1604 is dependent on the number of packets transmitted by the second node 1606. A second curve 1614 represents communication in which includes mutual mesh-based communication and direct communication. Here, the nodes 1604, 1606 can transmit their respective packets and each node 1604, 1606 can relay for the other node 1606, 1604. A third curve 1616 represents communication in which each node 1604, 1606 handles its own packets. The number of packets transmitted by each node 1604, 1606 depends on the battery power and link quality associated with the node 1604, 1606.

In some examples, direct and mesh links may be managed by leveraging large downlink direct coverage. In one example, an advertising discovery period is provided and synchronization may be performed prior to the commencement of the discovery period. In some instances, centralized routing optimization updates may be provided.

In some examples, direct and mesh links may be partitioned across time, frequency, and/or space.

Certain aspects enable low power pre-scheduled multi-hop transactions to be configured and performed. Pre-scheduled link transmit and receive pairs may be allotted margin that accounts for timing drift.

In some examples, wakeup and transactions may be included in a resync message but with the pair only. Resync need not be performed with the network. Full resync with network may be performed only for discovery to save power consumption.

In some examples, an energy efficient routing protocol may be employed. Routing decisions may be made per packet or based on predefined scheduling that balances energy consumption across nodes.

Flexible Use of FDD Spectrum on Licensed Spectrum

In accordance with certain aspects disclosed herein, networks of IoE devices may participate in WAN and mesh network communications using licensed spectrum, where the direct and mesh networks of IoE devices are managed based on a flexible use of the FDD spectrum. FDD separates the uplink and downlink into two bands. In some later technologies, such as 4G LTE, device-to-device (D2D) communications may permit UEs to listen on a band designated for uplink transmission. Certain implementations may adapt PHY layer and/or MAC layer components to provide flexibility across both mobile devices and base stations. For example, certain mobile devices configured for D2D communications may be adapted to listen on bands designated for uplink transmission. Flexible use of the FDD spectrum may have application in wide area networks of low power devices, where high-power base stations may be configured to listen on downlink band for integrated access and for backhaul traffic transmitted in an over-the-air backhaul path. IoE devices, such as sensors, can listen on the uplink band, and/or may transmit on the downlink band for multi-hop mesh. The IoE device may be configured to use the downlink band when the IoE device is stationary. Flexible use of the FDD spectrum may enable and support mesh networks using licensed spectrum that are better managed than mesh networks that operate on unlicensed frequencies. The table 1700 in FIG. 17 illustrates one example of PHY/MAC adaptation in a 5G network.

Figure 18:
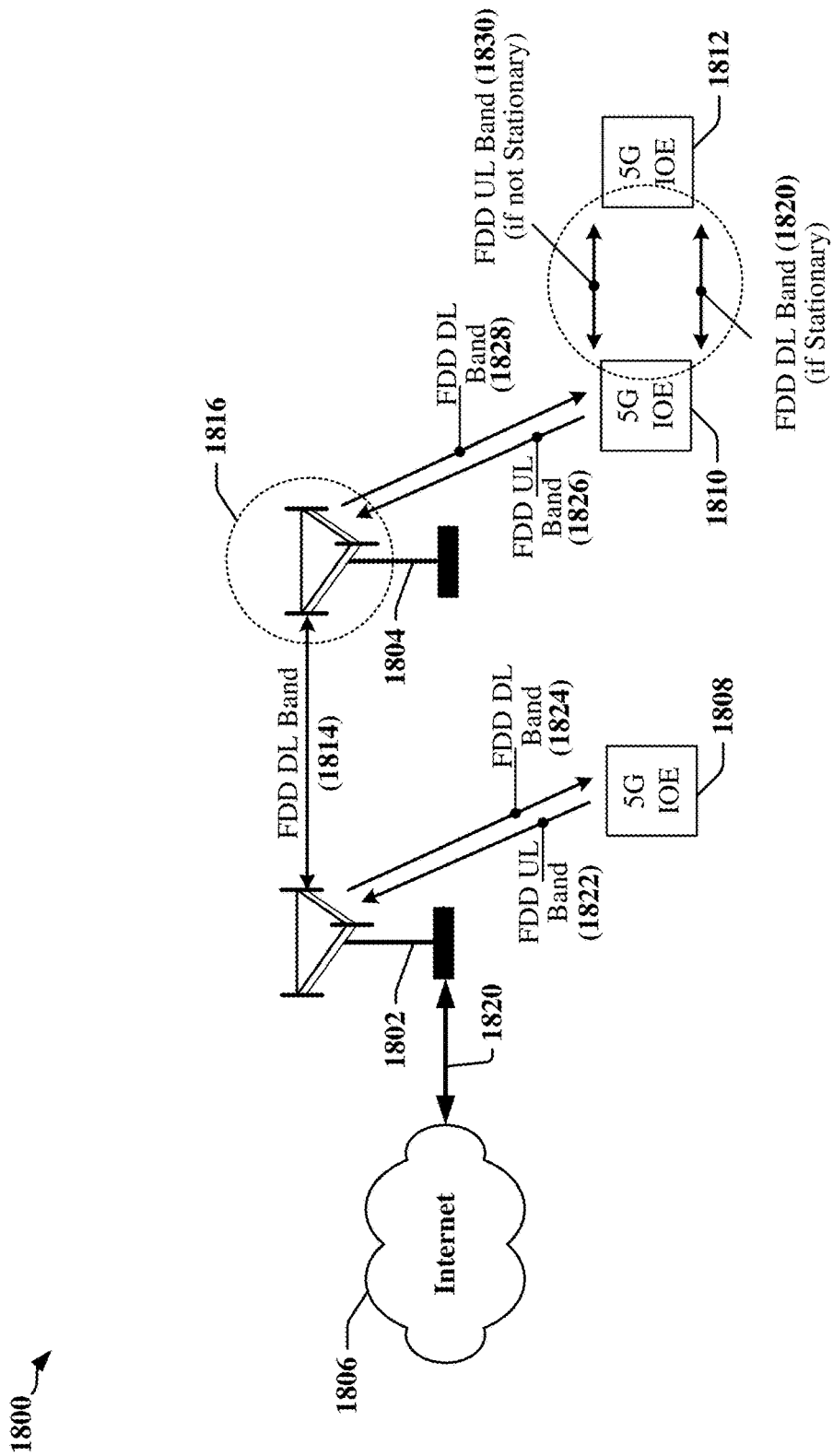
FIG. 18 illustrates an edgeless Internet of everything networking environment provided in accordance with certain aspects disclosed herein.

With reference to FIG. 18, and in accordance with certain aspects disclosed herein, downlink bands may be used by stationary IoE devices for transmitting mesh traffic. High power base stations 1802, 1804 can listen on downlink bands for integrated access and to implement an over-the-air backhaul 1814. The over-the-air backhaul 1814 may be used to extend wireless service when a remote base station 1804 is not connected by copper or optical backhaul. IoE devices 1810, 1812, including sensors can listen on an uplink band 1830, and/or transmit on a downlink band 1820 to implement single-hop or multi-hop mesh networks. In some instances, the availability of the uplink band 1830, and/or the downlink band 1820 may be conditioned on the IoE devices 1808, 1812 being stationary. The use of licensed spectrum can provide better management of mesh networks than available in conventional mesh networks that use unlicensed frequencies.

The networking environment illustrated in FIG. 18 operates using flexible FDD, and may be referred to as an "edgeless Internet of everything." In conventional networks, sensors and machine communications underutilize spectrum assigned or used to implement a network of sensors. Low payload and low duty cycle from single battery charge devices contribute to the limited network use, particularly where uplink communications can drain sensor batteries.

The use of flexible FDD for wide-area IoE networks, in accordance with certain aspects disclosed herein, can enable cell-to-cell transmission for multi-hop relay on FDD downlink bands. The downlink spectrum is typically underutilized, and the use of the downlink spectrum for IoE networks permits fast deployment with chokepoints to be backhauled later as needed. Flexible application of FDD spectrum may enable IoE-to-IoE transmission for multi-hop relay on FDD uplink and/or FDD downlink, and may leverage the underutilized downlink spectrum among IoE nodes that are stationary.

Figure 19:
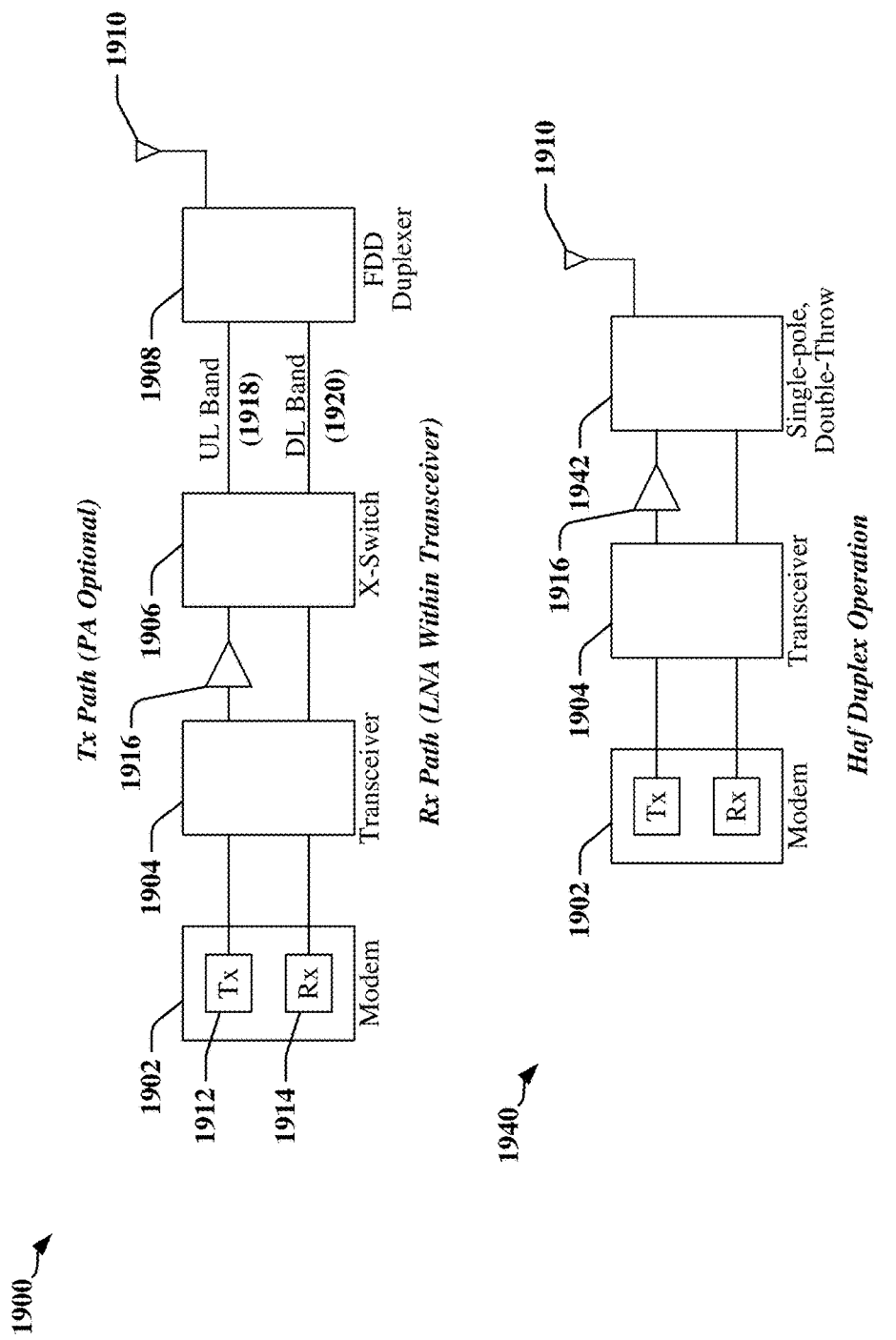
FIG. 19 illustrates examples of radio configuration for flexible frequency division duplexing in accordance with certain aspects disclosed herein.

FIG. 19 illustrates examples 1900, 1940 of radio configuration for flexible FDD. An existing radio front-end may be adapted to enable flexible FDD. The adapted radio front-end may exploit the lack of simultaneous transmission or reception across both uplink and downlink bands. Other radio configurations and additional approaches may be used to support of Tx/Rx on UL band only or on the DL band only.

FIG. 19 includes a first example 1900 of a radio configuration for flexible FDD that operates in full-duplex mode. A modem 1902 may include transmit 1912 and receive 1914 components that cooperate with a transceiver. A dual-pole, double throw switch (X-Switch) 1906 may be provided to configure FDD band 1918, 1920 usage.

FIG. 19 includes a second example 1940 of a radio configuration for flexible FDD that operates in half-duplex mode. Here the X-Switch 1906 and FDD Duplexer may be substituted with a single-pole, double throw switch 1942.

In some examples, FDD Uplink and/or FDD Downlink bands are enabled for a multi-hop mesh. Nodes in the multi-hop mesh may include base stations and/or IoE devices. FDD Uplink and/or FDD Downlink bands may be used to extend coverage as needed when FDD spectrum is underutilized.

In some examples, base stations support combined Tx and Rx only on the FDD Downlink Band. In some instances, full Tx/Rx may be provided on FDD Uplink Band when Tx Power is within certain effective isotropic radiated power (EIRP) limits.

In some examples, IoE devices have Tx/Rx on FDD Uplink Band. Full Tx/Rx may be provided on FDD Downlink Band when IoE devices are stationary, thereby permitting Tx.

In some examples, IoE devices can use converged radio with small front-end modifications.

Figure 20:
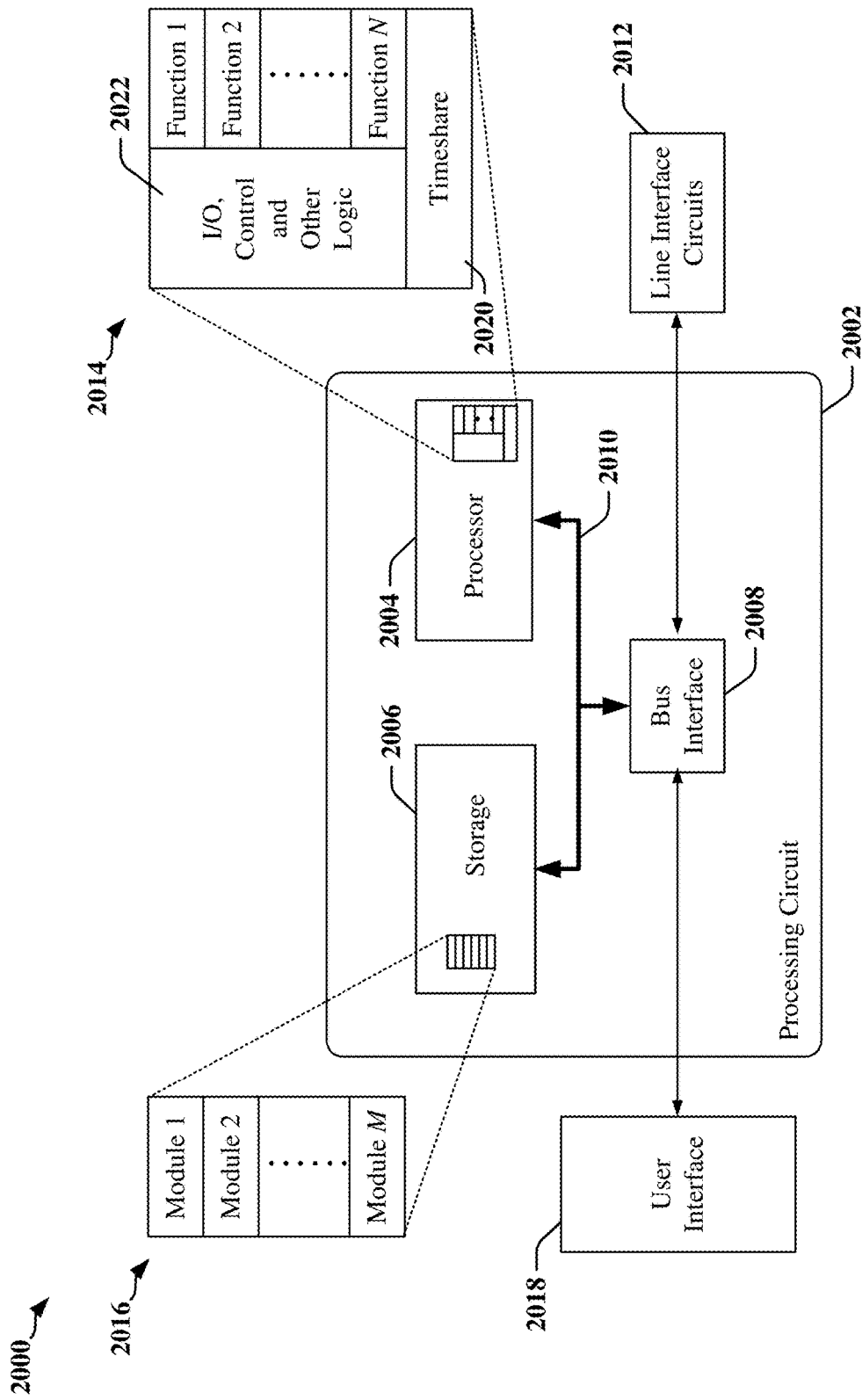
FIG. 20 is a block diagram illustrating an example of an apparatus employing a processing circuit that may be adapted according to certain aspects disclosed herein.

FIG. 20 is a conceptual diagram 2000 illustrating a simplified example of a hardware implementation for an apparatus employing a processing circuit 2002 that may be configured to perform one or more functions disclosed herein. In accordance with various aspects of the disclosure, an element, or any portion of an element, or any combination of elements as disclosed herein may be implemented using the processing circuit 2002. The processing circuit 2002 may include one or more processors 2004 that are controlled by some combination of hardware and software modules. Hardware modules may include one or more analog or digital circuits that may perform some combination of logic functions and signal processing. Software modules may include blocks of code that may be used to configure and/or control operations of a processor 2004 in the performance of one or more functions. Examples of processors 2004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. The bus 2010 links together various circuits including the one or more processors 2004, and storage 2006. Storage 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more transceivers 2012. A transceiver 2012 may be provided for each networking technology supported by the processing circuit. In some instances, multiple networking technologies may share some or all of the circuitry or processing modules found in a transceiver 2012. Each transceiver 2012 provides a means for communicating with various other apparatus over a transmission medium. Depending upon the nature of the apparatus, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium that may include the storage 2006. In this respect, the processing circuit 2002, including the processor 2004, may be used to implement any of the methods, functions and techniques disclosed herein. The storage 2006 may be used for storing data that is manipulated by the processor 2004 when executing software, and the software may be configured to implement any one of the methods disclosed herein.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2006 or in an external computer readable medium. The external computer-readable medium and/or storage 2006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 2006 may also include, by way of example, a carrier wave, a transmission line, and any other suitable medium for transmitting software and/or instructions that may be accessed and read by a computer. Computer-readable medium and/or the storage 2006 may reside in the processing circuit 2002, in the processor 2004, external to the processing circuit 2002, or be distributed across multiple entities including the processing circuit 2002. The computer-readable medium and/or storage 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a run-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as the transceiver 2012, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to the transceiver 2012, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the transceiver 2012, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

The following flowcharts illustrate methods and processes performed or operative on network elements adapted or configured in accordance with certain aspects disclosed herein. The methods and processes may be implemented in any suitable network technology, including 3G, 4G, and 5G technologies, to name but a few. Accordingly, the claims are not restricted to a single network technology. In this regard, a reference to a "UE" may be understood to refer also to a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A reference to an "eNodeB" may be understood to refer to a base station, a base transceiver station, a radio base station, a radio transceiver, a transceiver function, a basic service set, an extended service set, or some other suitable terminology. A reference to an MME may refer also to an entity that serves as an authenticator in the serving network and/or a primary service delivery node such as a Mobile Switching Center, for example. A reference to the HSS may refer also to a database that contains user-related and subscriber-related information, provides support functions in mobility management, call and session setup, and/or user authentication and access authorization, including, for example, a Home Location Register (HLR), Authentication Centre (AuC) and/or an authentication, authorization, and accounting (AAA) server.

Figure 21:
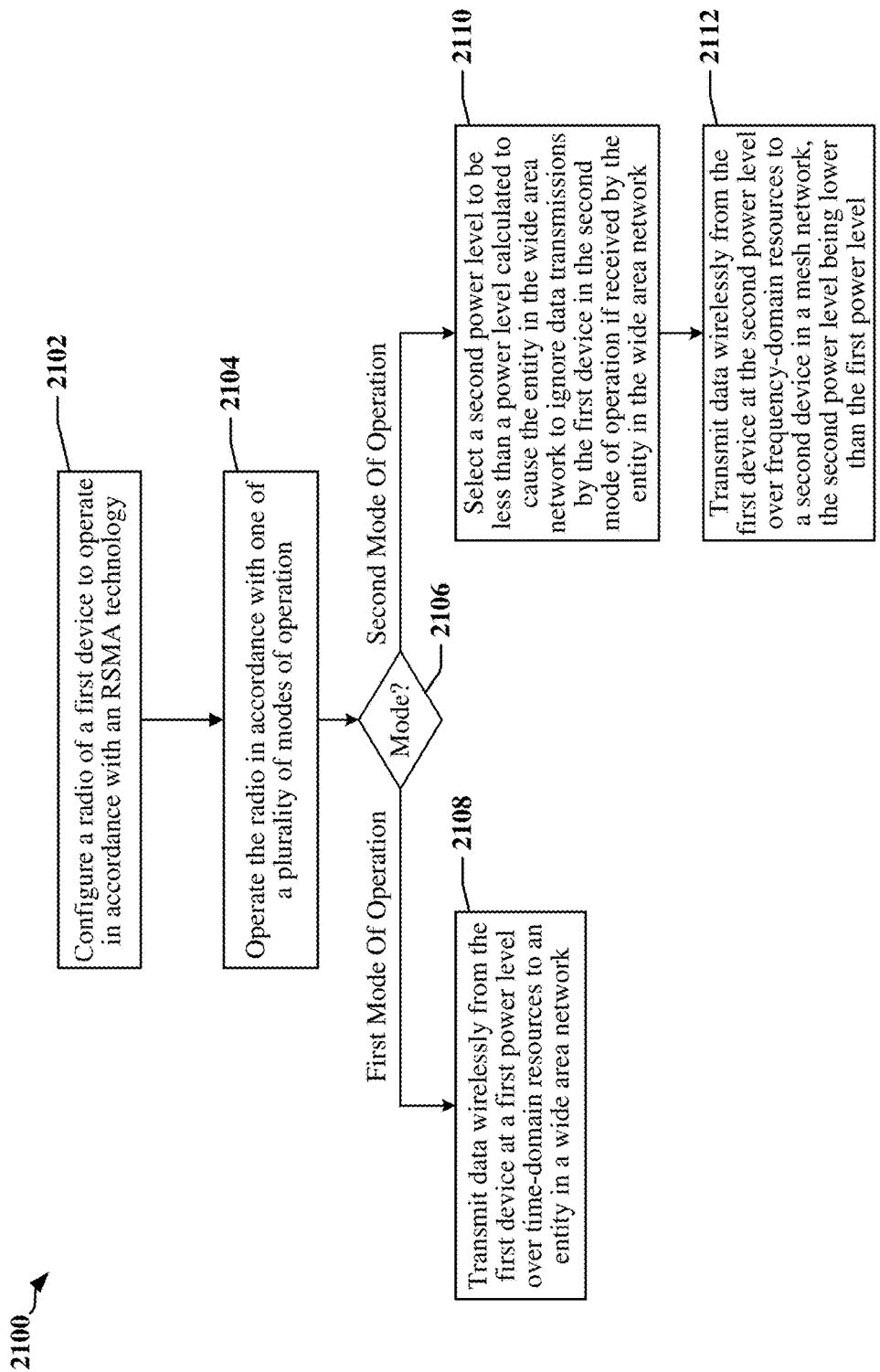
FIG. 21 is a flow chart of a first method of wireless communication according to certain aspects disclosed herein.

FIG. 21 is a flow chart 2100 of a method of wireless communication. The method may be performed by a first device connected to a mesh network.

At block 2102, a radio of the first device may be configured to operate in accordance with an RSMA technology. The radio may be configured to spread data over time-domain resources in a first mode of operation. The radio may be configured to spread data over frequency-domain resources in a second mode of operation. Configuring the first device may include configuring to the radio to use a low-density parity-check error-correction code.

At block 2104, the radio may be operated in accordance with one of a plurality of modes of operation. The radio may be dynamically reconfigured based on mode of operation. For example, the radio may be configured to communicate using a first mode of operation at a first time specified by scheduling information received by the first device, and reconfigured to communicate using a second mode of operation at a second time specified by the scheduling information.

At block 2106, a current mode of operation may be determined. In one example, the current mode of operation may be determined based on scheduling information received from a scheduling entity of a WAN. One or more modes of operation may be enabled at idle times in the scheduling information. Two modes of operation are illustrated in the flow chart 2100. If a first mode of operation is selected, then the method continues at block 2108. If the second mode of operation is selected, then the method continues at block 2110.

At block 2108, the radio may be operated in accordance with the first mode of operation, and may transmit data wirelessly from the first device at a first power level over time-domain resources to an entity in a wide area network.

At block 2110, the radio may be operated in accordance with the second mode of operation, and a second power level may be selected for use in the second mode of operation. The second power level may be selected to be less than a power level calculated to cause an entity in the wide area network to ignore data transmissions by the first device in the second mode of operation if received by the entity in the wide area network.

At block 2112, the radio may transmit data wirelessly from the first device at the second power level over frequency-domain resources to a second device in a mesh network. The second power level may be selected to be less than the first power level.

In some examples, the second power level may be selected to be less than a threshold power level. The threshold power level may be calculated to cause the entity in the wide area network to ignore data transmissions by the first device in the second mode of operation if received by the entity in the wide area network. In one example, the threshold power level may be calculated as the minimum transmission power level that corresponds to a received power level that is detectable at a scheduling entity, base station or the like. In another example, the threshold power level may be calculated as the minimum transmission power that corresponds to a received power level for signals that are not ignored or filtered by a scheduling entity, base station or the like. In another example, signals transmitted from the first device to the second device at the second power level may be detected by a scheduling entity or other entity in the wide area network. In another example, a scheduling entity or other entity in the wide area network that detects signals transmitted from the first device to the second device at the second power level may treat such signals as interfering signals, and may filter such interfering signals.

In some instances, the radio may be configured to spread data over a combination of time-domain resources and frequency-domain resources in a third mode of operation. In one example, the first device transmits wirelessly from the first device to the entity in the wide area network when the radio is operated in the third mode of operation. In a second example, the first device transmits wirelessly from the first device to the second device when the radio is operated in the third mode of operation.

According to certain aspects, the first device may receive data from the second device while the radio is operated in the second mode of operation, and may transmit the data to the wide area network when the radio is subsequently operated in the first mode of operation. The first device may aggregate data transmitted by a plurality of devices over the mesh network to obtain aggregated data. The first device may relay the aggregated data to the wide area network when the radio is subsequently operated in the first mode of operation.

In some instances, configuring the radio includes configuring the radio to encode data in a single-carrier waveform using a low rate code in the first mode of operation, and configuring the radio to encode data in a multicarrier OFDM waveform using the low rate code in the second mode of operation.

In one example, the first device may transmit a first message to the second device using a downlink frequency of the wide area network. The first message may be unrelated to the wide area network. The first device may transmit a second message to a third device using an uplink frequency of the wide area network while the radio is operated in the second mode of operation. The second message may be unrelated to the wide area network.

The wide area network may be a licensed network. The mesh network may be an unlicensed network, and the entity in the wide area network may include a base station.

Figure 22:
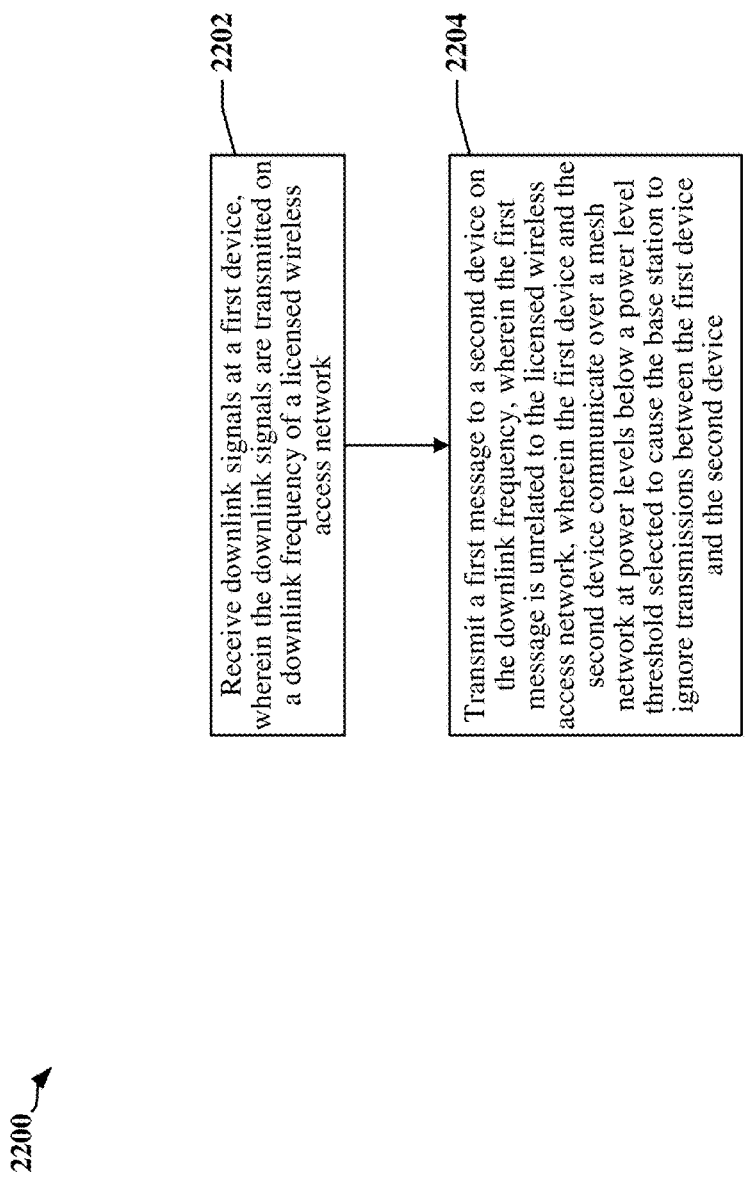
FIG. 22 is a flow chart of a second method of wireless communication according to certain aspects disclosed herein.

FIG. 22 is a flow chart 2200 of a method of wireless communication. The method may be performed by a first device connected to a mesh network.

At block 2202, the first device may receive downlink signals. The downlink signals may be transmitted on a downlink frequency of a licensed wireless access network.

At block 2204, the first device may transmit a first message to a second device on the downlink frequency. The first message may be unrelated to the licensed wireless access network. The first device and the second device may communicate over a mesh network at power levels below a power level threshold selected to cause the base station to ignore transmissions between the first device and the second device.

In some instances, the first message is related to a two-way exchange between the first device and the second device. The first message may be part of a point-to-point exchange the first device and the second device. The mesh network may be an unlicensed network.

In some instances, the first device may transmit a second message to an entity of the licensed wireless access network using an uplink frequency of the licensed wireless access network, and transmit a third message to a third device on the uplink frequency. The third message may be unrelated to the licensed wireless access network. The first device and the third device may communicate over the mesh network at power levels below a power level threshold selected to cause the base station to ignore transmissions between the first device and the third device.

In some instances, the first message is transmitted on the downlink frequency when the first device is stationary and the third message is transmitted on the uplink frequency when the first device is in motion. The downlink signals may be transmitted by a base station. The base station may be configured to receive transmissions on an uplink frequency. The base station may be restricted from transmitting on the uplink frequency. The third message may be transmitted over the mesh network using the uplink frequency when a transmit power of the first device lies within predefined effective isotropic radiated power limits. The first message may be transmitted to the second device over the mesh network using the using a downlink frequency when the downlink frequency is underutilized.

Figure 23:
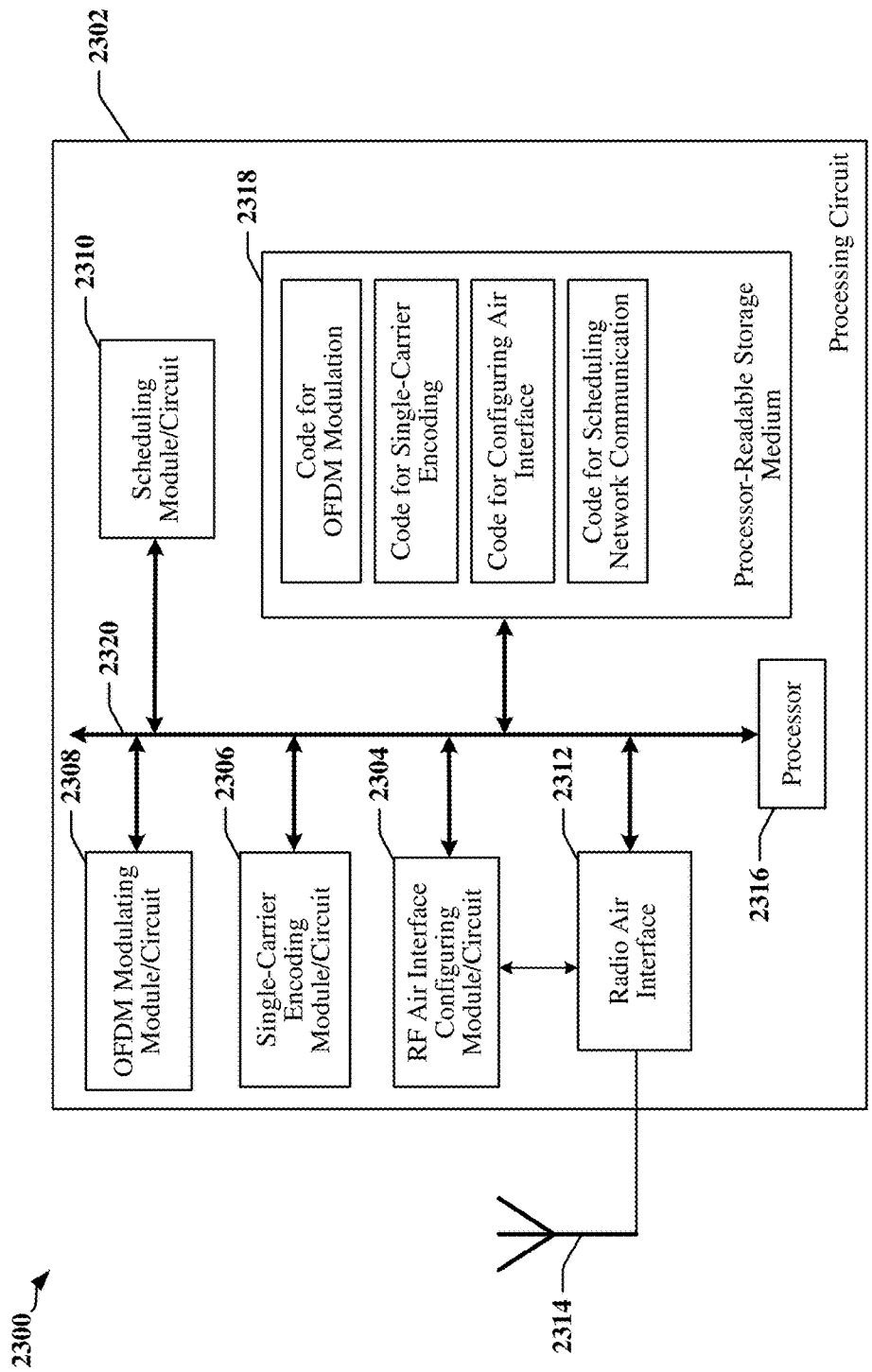
FIG. 23 is a diagram illustrating an example of a hardware implementation for an apparatus according to one or more aspects disclosed herein.

FIG. 23 is a diagram illustrating an example of a hardware implementation for an apparatus 2300 employing a processing circuit 2302. The processing circuit typically has a processor 2316 that may include one or more of a microprocessor, microcontroller, digital signal processor, a sequencer and a state machine. The processing circuit 2302 may be implemented with a bus architecture, represented generally by the bus 2320. The bus 2320 may include any number of interconnecting buses and bridges depending on the specific application of the processing circuit 2302 and the overall design constraints. The bus 2320 links together various circuits including one or more processors and/or hardware modules, represented by the processor 2316, the modules or circuits 2304, 2306, 2308, and 2310, a radio air interface 2312 that may be include or cooperate with an RF transmitter coupled to an antenna 2314, and the computer-readable storage medium 2318. The bus 2320 may also link various other circuits such as timing sources, peripherals, voltage regulators, and power management circuits, which are well known in the art, and therefore, will not be described any further.

The processor 2316 is responsible for general processing, including the execution of software stored on the computer-readable storage medium 2318. The software, when executed by the processor 2316, causes the processing circuit 2302 to perform the various functions described supra for any particular apparatus. The computer-readable storage medium 2318 may also be used for storing data that is manipulated by the processor 2316 when executing software, including data decoded from symbols received through the antenna 2314. The processing circuit 2302 further includes at least one of the modules 2304, 2306, 2308, and 2310. The modules 2304, 2306, 2308, and 2310 may be software modules running in the processor 2316, resident/stored in the computer-readable storage medium 2318, one or more hardware modules coupled to the processor 2316, or some combination thereof. The modules 2304, 2306, 2308, and/or 2310 may include microcontroller instructions, state machine configuration parameters, or some combination thereof.

In one configuration, the apparatus 2300 for wireless communication includes modules and/or circuits 2304 for configuring the radio air interface 2312, including logic configured to select an output of the radio air interface 2312 from a plurality of signals including a single-carrier encoded data stream and an OFDM modulated data stream. The apparatus 2300 may include modules and/or circuits 2306 for encoding data in accordance with a single-carrier RSMA coding scheme. The apparatus 2300 may include modules and/or circuits 2308 for modulating the single-carrier encoded data stream to obtain the OFDM modulated data stream.

In another configuration, the apparatus 2300 for wireless communication includes a radio air interface 2312, modules and/or circuits 2304 for configuring a radio air interface, where the radio air interface may be configured for a first mode of communication and for a second mode of communication. The apparatus 2300 may include modules and/or circuits 2310 for determining WAN timing from downlink signals received from a base station when the radio air interface is configured for the first mode of communication, and for configuring mesh network timing. The means for configuring mesh network timing may be adapted to configure mesh network timing based on the WAN timing. The apparatus 2300 may include modules, circuits, and/or devices 2306, 2308, 2312, 2314 for communicating wirelessly with a mesh device in accordance with the mesh network timing when the radio air interface is configured for the second mode of communication. The apparatus and the mesh device communicate at power levels below a power level threshold selected to cause the base station to ignore transmissions between the apparatus and the mesh device.

In another configuration, the apparatus 2300 may include modules and/or circuits 2312, 2314 for receiving downlink signals at a first device, where the downlink signals are transmitted on a downlink frequency of a licensed wireless access network. The apparatus 2300 may include modules and/or circuits 2306, 2308, 2312, 2314 for communicating on wireless networks, including the radio air interface 2312 configured to transmit a first message to a second device on the downlink frequency, where the first message is unrelated to the licensed wireless access network. The apparatus and the second device may communicate over a mesh network at power levels below a power level threshold selected to cause the base station to ignore transmissions between the first device and the second device.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
configuring a radio of a first device to operate in accordance with a resource-spread multiple access (RSMA) technology in accordance with one of a plurality of modes of operation;
spreading encoded information over time-domain resources to obtain a single carrier data signal;
in a first mode of operation, transmitting the single carrier data signal through a radio frequency front end (RFFE) of the first device to an entity in a wide area network; and
in a second mode of operation:
   (a) spreading the single carrier data signal across different sub-channels to obtain an orthogonal frequency division multiplex waveform (OFDM waveform); and
   (b) transmitting the OFDM waveform through the RFFE to a second device in a mesh network.

2. The method of claim 1, wherein in a third mode of operation the radio is configured to spread data over a combination of time-domain resources and frequency-domain resources.

3. The method of claim 2, further comprising:
transmitting wirelessly from the first device to the entity in the wide area network when the radio is operated in the third mode of operation.

4. The method of claim 2, further comprising:
transmitting wirelessly from the first device to the second device when the radio is operated in the third mode of operation.

5. The method of claim 1, further comprising:
receiving data from the second device while the radio is operated in the second mode of operation; and
transmitting the data to the wide area network when the radio is subsequently operated in the first mode of operation.

6. The method of claim 1, further comprising:
aggregating data transmitted by a plurality of devices over the mesh network to obtain aggregated data; and
relaying the aggregated data to the wide area network when the radio is subsequently operated in the first mode of operation.

7. The method of claim 1, wherein configuring the radio comprises:
configuring the radio to encode data in a single-carrier waveform using a low rate code in the first mode of operation; and
configuring the radio to encode data in a multicarrier orthogonal frequency division multiplex (OFDM) waveform using the low rate code in the second mode of operation.

8. The method of claim 1, wherein operating the radio includes:
configuring the radio to communicate using the first mode of operation at a first time specified by scheduling information received by the first device; and
dynamically reconfiguring the radio to communicate using the second mode of operation at a second time specified by the scheduling information.

9. The method of claim 1, further comprising:
transmitting from the first device a first message to the second device using a downlink frequency of the wide area network, wherein the first message is unrelated to the wide area network.

10. The method of claim 9, further comprising:
transmitting from the first device a second message to a third device using an uplink frequency of the wide area network while the radio is operated in the second mode of operation,
wherein the second message is unrelated to the wide area network.

11. The method of claim 1, wherein the wide area network is a licensed network and the mesh network is an unlicensed network, and wherein the entity in the wide area network comprises a base station.

12. An apparatus configured for wireless communication, comprising:
a radio frequency transceiver;
a first circuit configured to encode data in an encoded data stream in accordance with a single-carrier multiple access technology;
a second circuit configured to modulate the encoded data stream over frequency-domain resources using orthogonal frequency division multiplex (OFDM) modulation to obtain an OFDM modulated data stream; and
a third circuit configured to select between the encoded data stream and the OFDM modulated data stream to provide an input to the radio frequency transceiver,
wherein the encoded data stream is selected when the apparatus is communicating with a remote network entity, the encoded data stream being spread over time-domain resources, and
wherein the OFDM modulated data stream is selected when the apparatus is transmitting to a device coupled to a mesh network.

13. The apparatus of claim 12, wherein the third circuit is configured to select a portion of the encoded data stream and the OFDM modulated data stream to provide the input to the radio frequency transceiver.

14. The apparatus of claim 12, wherein the second circuit comprises:
an inverse Fast Fourier Transform (IFFT) processor that produces a time-domain OFDM symbol stream from the encoded data stream.

15. The apparatus of claim 12, wherein the encoded data stream is transmitted using a single-carrier waveform.

16. The apparatus of claim 12, wherein the encoded data stream and the OFDM modulated data stream use related numerologies or scaled numerologies.

17. The apparatus of claim 12, wherein the remote network entity is a base station in a licensed wireless access network and the mesh network is an unlicensed network.

18. The apparatus of claim 12, further comprising a processing circuit configured to:
maintain scheduling information received from a scheduling entity of a wide area network; and
dynamically reconfigure the third circuit in accordance with the scheduling information, wherein:
(a) at a first time specified by scheduling information, the processing circuit is configured to control the third circuit such that the third circuit provides the encoded data stream as the input to the radio frequency transceiver; and
(b) at a second time derived from the scheduling information, the processing circuit is configured to control the third circuit such that the third circuit provides the OFDM modulated data stream as the input to the radio frequency transceiver.

19. The apparatus of claim 12, wherein the single-carrier multiple access technology employs time-division duplexed pilot and control signals.

20. An apparatus configured for wireless communication, comprising:
a radio air interface comprising:
a spreader configured to spread an encoded data stream over time-domain resources;
an orthogonal frequency division multiplex waveform (OFDM waveform) modulator configured to further spread the encoded data stream across different sub-channels to obtain an orthogonal frequency division multiplex data stream (OFDM data stream);
a radio front end (RFFE);
switching logic configured to provide an input to the RFFE and operable to select between the encoded data stream and the OFDM data stream as the input to the RFFE; and
means for selecting an output of the radio air interface from a plurality of signals including the encoded data stream and the OFDM data stream; and
means for encoding input data in accordance with a resource-spread multiple access (RSMA) coding scheme, wherein the means for encoding input data provides an input to the spreader,
wherein a first mode of operation, the means for selecting an output of the radio air interface selects the encoded data stream as the output of the radio air interface and data is spread data over time-domain resources,
wherein in a second mode of operation, the means for selecting an output of the radio air interface selects the OFDM data stream as the output of the radio air interface and data is spread data over frequency-domain resources,
wherein the apparatus transmits to an entity of a wide area network in the first mode of operation, and
wherein the apparatus transmits to a first device in a mesh network in the second mode of operation.

21. The apparatus of claim 20, wherein in a third mode of operation, the means for selecting an output of the radio air interface selects a portion of the encoded data stream and the OFDM data stream as the output of the radio air interface, and wherein data is spread over a combination of time-domain resources and frequency-domain resources in the third mode of operation.

22. The apparatus of claim 20, wherein the encoded data stream is transmitted on a single-carrier in the first mode of operation.

23. The apparatus of claim 20, wherein the means for selecting an output of the radio air interface is operable to:
configure the radio air interface to communicate using the first mode of operation at a first time specified by scheduling information received by the first device; and
dynamically reconfigure the radio air interface to communicate using the second mode of operation at a second time specified by the scheduling information.

24. The apparatus of claim 20, wherein the radio air interface is configured to use a downlink frequency of the wide area network to transmit a first message unrelated to the wide area network to the first device in the second mode of operation.

25. The apparatus of claim 24, wherein the radio air interface is configured to use an uplink frequency of the wide area network to transmit a third message unrelated to the wide area network to a second device on the mesh network in the second mode of operation.

26. A non-transitory computer readable medium storing computer executable code, the code comprising instructions for:
configuring a radio of a first device to operate in accordance with a resource-spread multiple access (RSMA) technology in accordance with one of a plurality of modes of operation; and
wherein, in a first mode of operation, the single carrier data signal is transmitted through a radio frequency front end (RFFE) of the first device to an entity in a wide area network, and wherein, in a second mode of operation:

(a) the single carrier data signal is spread across different sub-channels to obtain an orthogonal frequency division multiplex waveform (OFDM waveform); and
(b) the OFDM waveform is transmitted through the RFFE to a second device in a mesh network.

27. The computer readable medium of claim 26, wherein in a third mode of operation the radio is configured to spread data over a combination of time-domain resources and frequency-domain resources.

28. The computer readable medium of claim 27, further comprising instructions for:
transmitting wirelessly from the first device to the entity in the wide area network when the radio is operated in the third mode of operation.

29. The computer readable medium of claim 27, further comprising instructions for:
transmitting wirelessly from the first device to the second device when the radio is operated in the third mode of operation.

30. The computer readable medium of claim 26, further comprising instructions for:
receiving data from the second device while the radio is operated in the second mode of operation; and
transmitting the data to the wide area network when the radio is subsequently operated in the first mode of operation.

31. The method of claim 1, and further comprising:
encoding input data using a low code rate to obtain the encoded information.

32. The method of claim 1, wherein:
the single carrier data signal is transmitted at a first power level in the first mode of operation;
the OFDM waveform is transmitted at a second power level lower than the first power level; and
the second power level is selected to be less than a power level calculated to cause the entity in the wide area network to ignore data transmissions by the first device in the second mode of operation if received by the entity in the wide area network.

* * * * *